US012623370B2

(12) United States Patent
Smith

(10) Patent No.: US 12,623,370 B2
(45) Date of Patent: May 12, 2026

(54) MORTISING JIG

(71) Applicant: Jessem Tool Corporation, Moncton (CA)

(72) Inventor: Darrin E. Smith, Moncton (CA)

(73) Assignee: JESSEM TOOL CORPORATION, Moncton (CA)

( * ) Notice: Subject to any disclaimer, the term of this patent is extended or adjusted under 35 U.S.C. 154(b) by 431 days.

(21) Appl. No.: 18/168,717

(22) Filed: Feb. 14, 2023

(65) Prior Publication Data

US 2024/0269881 A1 Aug. 15, 2024

(51) Int. Cl.
*B27F 5/12* (2006.01)

(52) U.S. Cl.
CPC ...................................... *B27F 5/12* (2013.01)

(58) Field of Classification Search
CPC ..... B23B 47/287; B23B 47/28; B23B 45/003; B27C 3/00; B27C 3/02; B27C 3/06; B27C 3/08; B27F 1/02; B27F 1/04; B27F 1/08; B27F 1/12
See application file for complete search history.

(56) References Cited

U.S. PATENT DOCUMENTS

| | | | | |
|---|---|---|---|---|
| 2,586,798 | A | 2/1952 | Eck | |
| 2,602,375 | A | 7/1952 | Holt | |
| 2,790,470 | A | 4/1957 | Graham | |
| 3,272,244 | A | 9/1966 | Nemec | |
| 4,130,372 | A | 12/1978 | Vugrin | |
| 4,995,435 | A * | 2/1991 | Godfrey | B27F 1/02 144/144.1 |
| 5,146,961 | A | 9/1992 | Schoeller | |
| 5,584,328 | A | 12/1996 | Grisley | |
| 6,343,632 | B1 | 2/2002 | Zivojinovic | |
| 6,899,152 | B2 * | 5/2005 | Godfrey | B23Q 9/005 144/144.51 |
| 6,991,007 | B2 | 1/2006 | Chang | |
| 7,997,308 | B2 * | 8/2011 | Stepp | B27F 1/12 144/144.1 |
| 8,087,858 | B2 | 1/2012 | Martin | |
| 11,351,644 | B2 | 6/2022 | Browning | |
| 11,376,671 | B1 * | 7/2022 | Wollenburg | B23B 49/003 |
| 2009/0272463 | A1 | 11/2009 | Smith | |

OTHER PUBLICATIONS

Extended European Search Report, European Application No. 2415700.9, Jul. 10, 2024, 9 pages.

* cited by examiner

*Primary Examiner* — Matthew Katcoff
(74) *Attorney, Agent, or Firm* — Stinson LLP

(57) ABSTRACT

A mortising jig and associated components and methods for cutting a mortise in a workpiece. The jig includes a guide assembly for locating and moving a drill bit of a drilling tool relative to the workpiece. The guide assembly includes a guide rail and a guide. The guide includes a guide carriage movably mounted on the guide rail for movement along the guide rail and a drill bit support. The drill bit support is movable with the guide carriage. The drill bit support includes a rest arranged to locate the drill bit of the drilling tool relative to the workpiece. The drill bit support is movable relative to the guide carriage to change a distance between the rest and the guide carriage.

17 Claims, 32 Drawing Sheets

MORTISING JIG

FIELD

The present invention generally relates to cutting jigs and more particularly to jigs for cutting mortises in workpieces.

BACKGROUND

A mortise and tenon joint is a well-known connection used to connect two workpieces or members, frequently wooden members, together. The joint comprises two parts, one for each member of the connection: (1) a hole (such as a blind hole) in a first member and (2) a tenon in a second member sized and shaped to be inserted into the hole of the first member. The joint may be further secured with an adhesive (e.g., glue).

SUMMARY

In one aspect, a jig for cutting a mortise in a workpiece using a drilling tool having a drill bit comprises a guide assembly configured to locate and move the drill bit of the drilling tool relative to the workpiece. The guide assembly comprises a guide rail and a guide. The guide comprises a guide carriage movably mounted on the guide rail for movement along the guide rail and a drill bit support arranged to be movable with the guide carriage. The drill bit support includes a rest arranged to locate the drill bit of the drilling tool relative to the workpiece. The drill bit support is movable relative to the guide carriage to change a distance between the rest and the guide carriage.

In another aspect, a jig for cutting a mortise in a workpiece using a drilling tool having a drill bit comprises a base defining a cutting window arranged to view the workpiece. A guide assembly is supported by the base. The guide assembly is configured to locate and move the drill bit of the drilling tool relative to the workpiece. The guide assembly comprises a guide rail and a guide carriage movably mounted on the guide rail for movement along the guide rail. The guide carriage has a drill bit opening sized and shaped to receive the drill bit of the drilling tool. The drill bit opening has a longitudinal axis that is coextensive with an axis of rotation about which the drill bit rotates when the drill bit is received in the drill bit opening. The guide assembly is movable relative to the base between a cutting position and a setup position. The longitudinal axis of the drill bit opening is aligned with or intersects the cutting window of the base when the guide assembly is in the cutting position. The longitudinal axis of the drill bit opening is spaced apart from the cutting window of the base when the guide assembly is in the setup position.

Other objects and features will be in part apparent and in part pointed out hereinafter.

BRIEF DESCRIPTION OF THE DRAWINGS

FIG. 14A is an enlarged cross-section of the mortising jig, with the guide in a starting position. FIG. 14B is similar to FIG. 14A, with the guide moved to the left and a drill bit lowered one step. FIG. 14C is similar to FIG. 14B, with the guide moved to the right and the drill bit lowered another step. FIG. 14D is similar to FIG. 14C, with the guide moved back to the left and the drill bit lowered another step;

Corresponding reference characters indicate corresponding parts throughout the drawings.

DETAILED DESCRIPTION

Figure 21A:
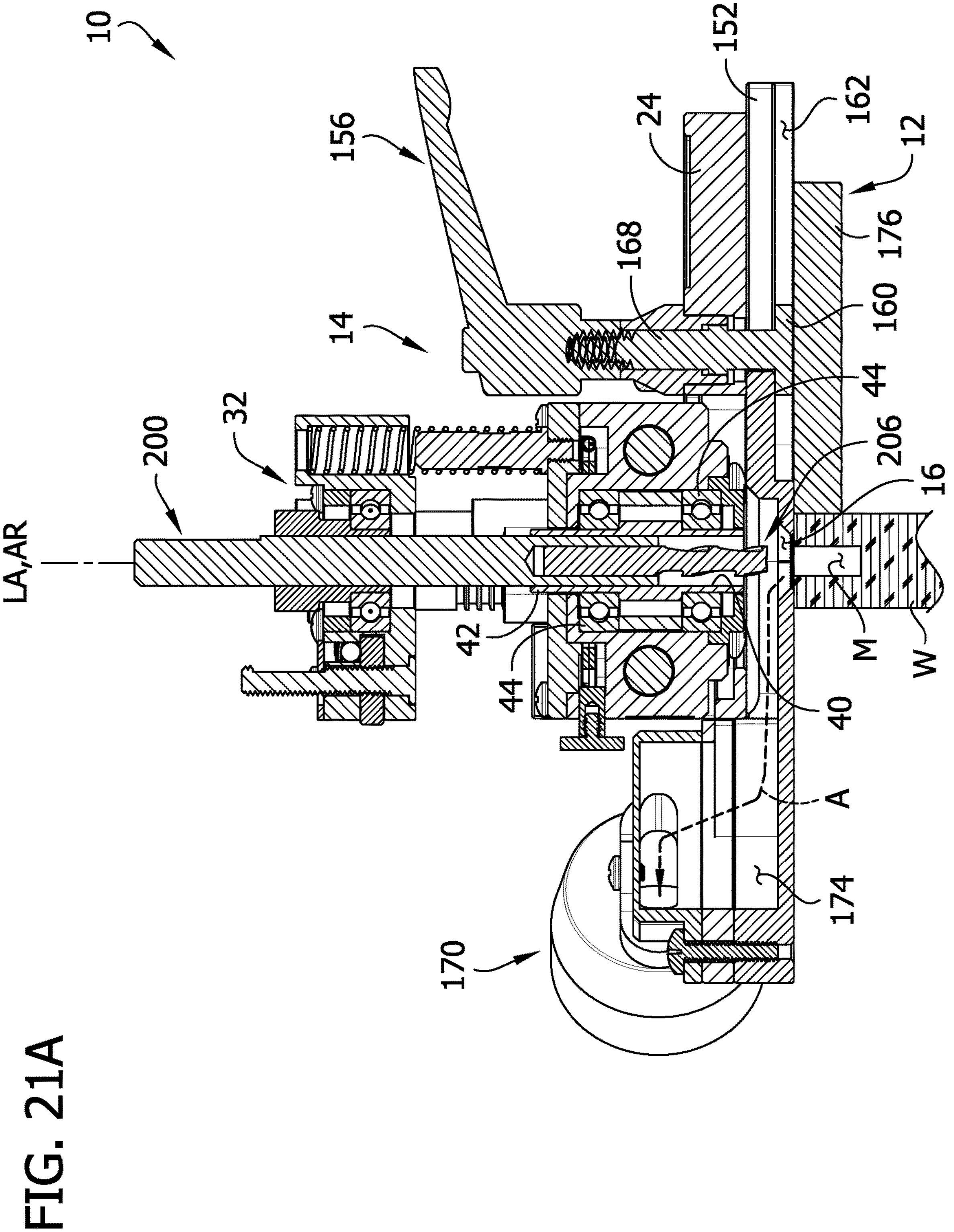
FIG. 21A is a vertical section of the mortising jig, with a guide assembly thereof in the cutting position.
Figure 21B:
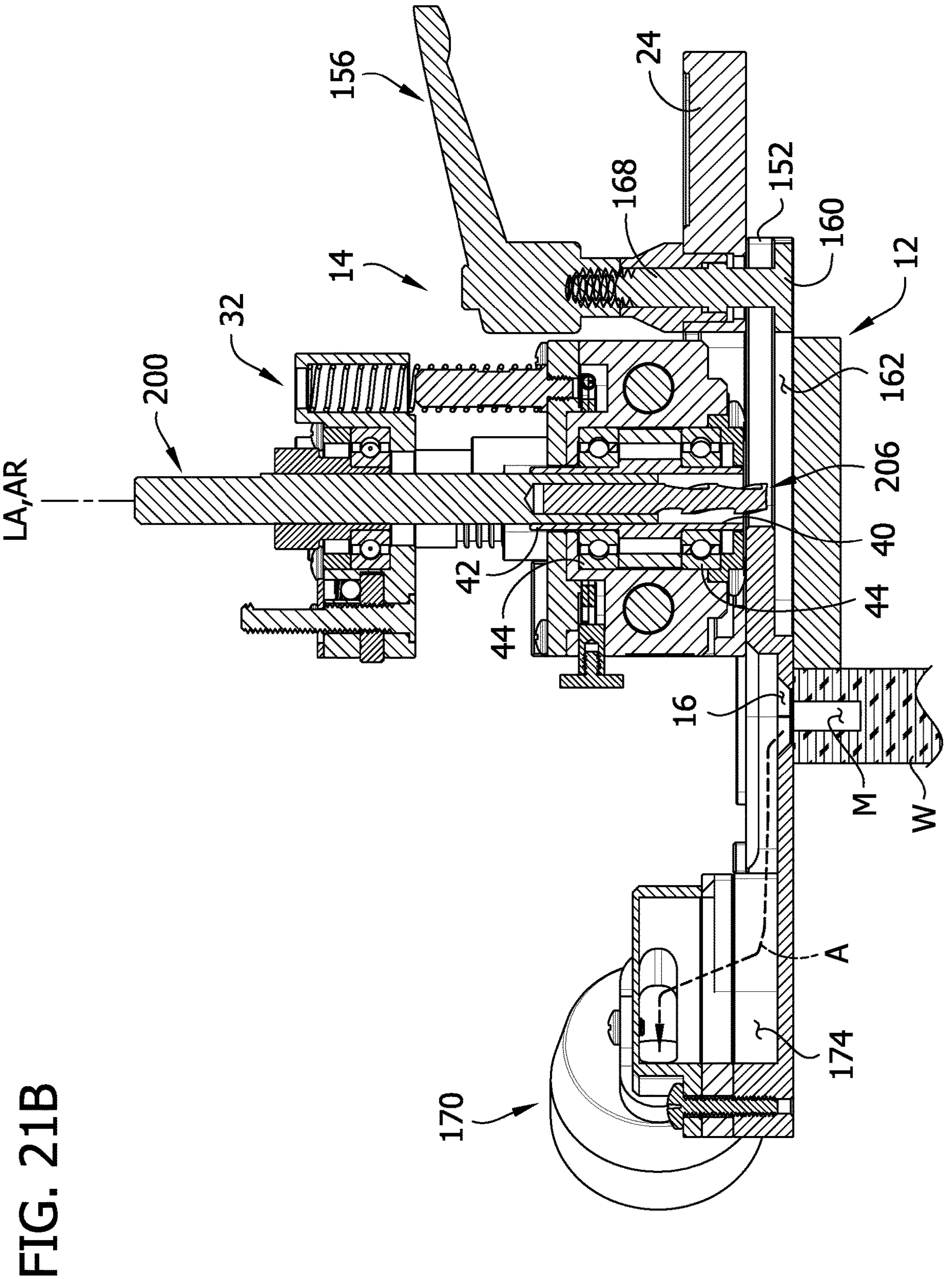
FIG. 21B is a vertical section of the mortising jig, with a guide assembly thereof in the release position.

The present disclosure relates to a mortise mill or mortising jig for creating a mortise M (FIG. 21A) of a mortise and tenon joint in a workpiece W. The workpiece W can be, for example, a wooden member (e.g., a piece of lumber). After the mortise M is created in the workpiece, a tenon on another workpiece (not shown) is inserted into the mortise to form the mortise and tenon joint connecting the two workpieces together. The tenon may be an integral part of the other workpiece or mortises may be cut in both workpieces that a separate tenon fits into.

Referring now to the drawings and in particular to FIGS. 1-4, a mortise mill or mortising jig (hereinafter "jig")

according to one embodiment of the present disclosure is generally indicated at reference numeral 10. The jig 10 is used for cutting a mortise M in a workpiece W. The jig 10 is used with a drilling tool 1, such as a power drill, a handheld power drill, or other well-known drilling tools. The drilling tool 1 has (broadly, is connected to) a drill bit 200 (described in more detail below) which cuts the mortise M as the drill bit is rotated by the drilling tool. The jig 10 is of the type primarily used for wood working. However, it is envisioned that other materials can be worked by this apparatus. The jig 10 of the present disclosure is classified as a drilling jig because it uses a standard power drill 1 with a drill bit 200 (e.g., a mortising drill bit) attachment to cut the mortise M. As will become apparent, the jig 10 receives and guides the drill bit during the operation of the jig to cut the mortise M in the workpiece W.

Figure 1:
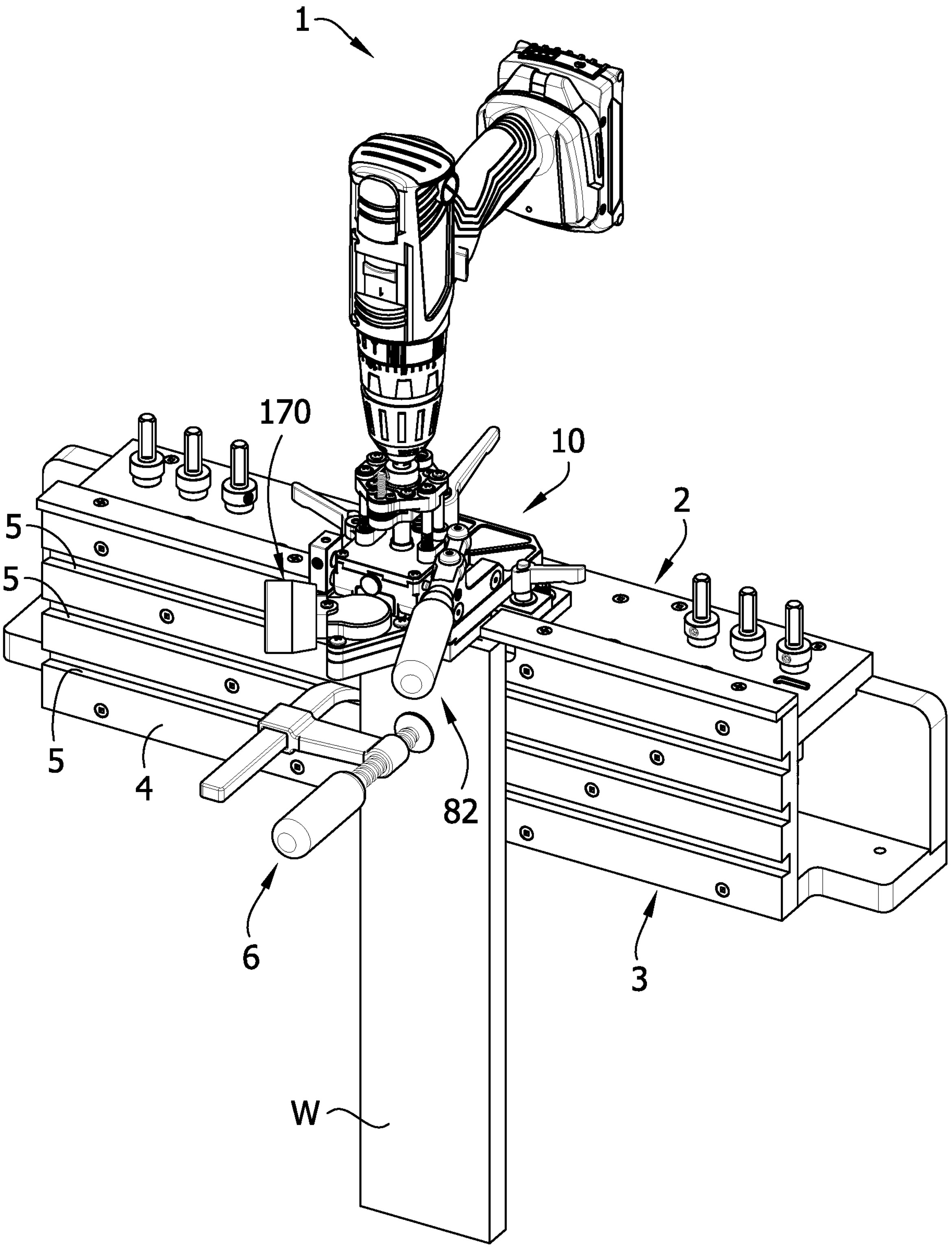
FIG. 1 is a front perspective of a mortising assembly according to one embodiment of the present disclosure being used to form a mortise in a workpiece.
Figure 2:
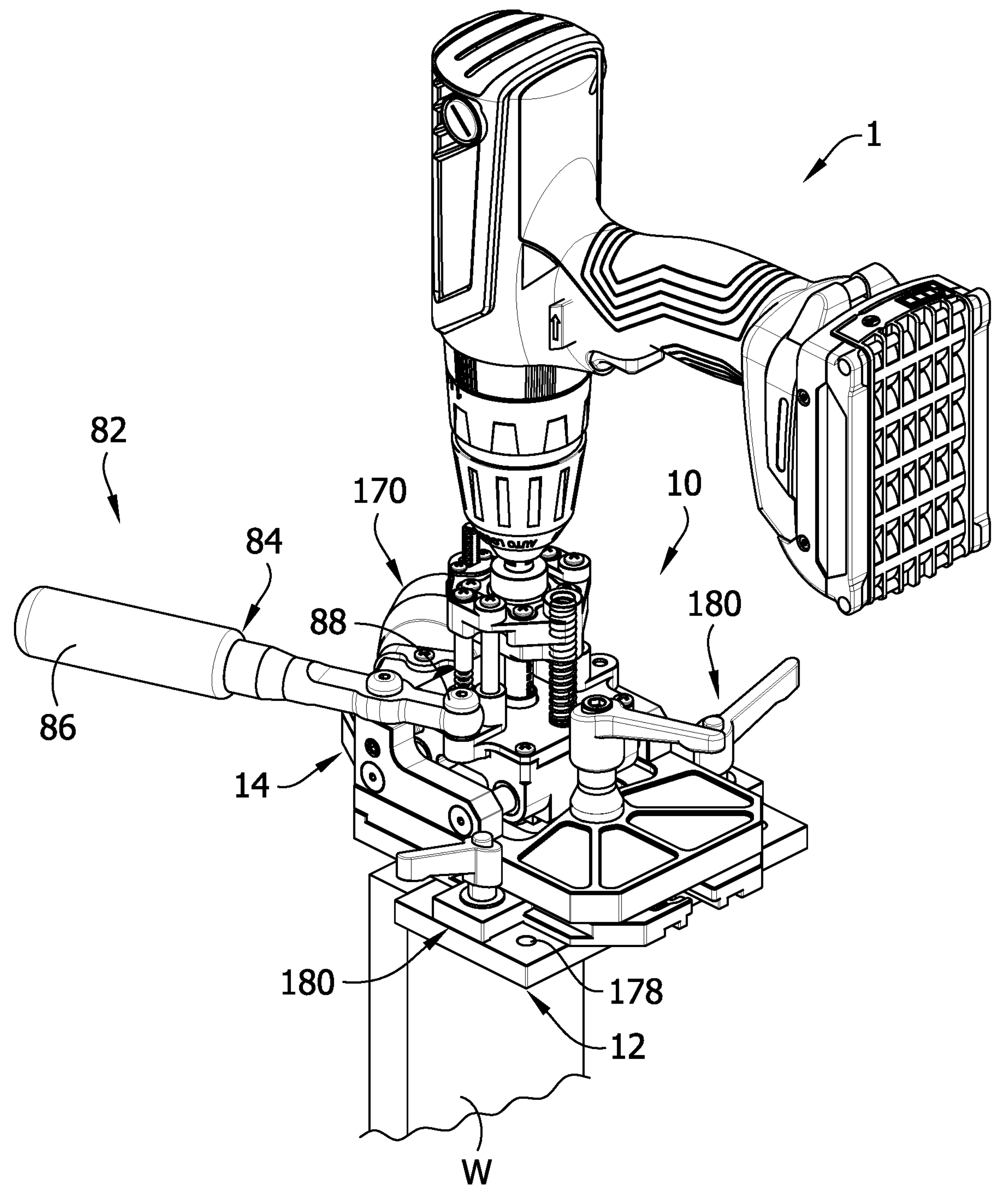
FIG. 2 is a back perspective a mortising jig and a drilling tool of the mortising assembly and a fragmentary portion of the workpiece.

The jig 10 includes a base 12 and a guide assembly 14. The guide assembly 14 is supported by and movably (e.g. slideably) attached to the base 12. The base 12 includes (e.g., defines) a cutting window or opening 16 arranged to view the workpiece W. The cutting window 16 permits an operator or user to view the portion of the workpiece that will be operated on (e.g., cut) to form the mortise M. In the illustrated embodiment, the base 12 is configured to be mounted to a mortising support or platform 2 (such as by one or more fasteners). The mortising support 2 generally comprising a woodworking fence 3 (as generally known in the art) having a front face 4 with one or more channels 5 therein for connecting accessories 6, such as the illustrated clamp, to the fence 3. The clamp 6 is used to secure (e.g., clamp) the workpiece W to the front face 4 of the fence 3 during operation of the jig 10. As illustrated, the jig 10 generally projects outward from the front face 4 of the fence 3 in operation. FIG. 1 illustrates but one way to secure the jig 10 and workpiece W relative to one another and other ways are within the scope of the present disclosure. For example, another embodiment of a mortising support is described in U.S. Pub. No. 2009/0272463, the entirety of which is incorporated herein by reference. In U.S. Pub. No. 2009/0272463, the mortising support is identified as a base.

Referring to FIGS. 3-6, the guide assembly 14 is configured to locate and move the drill bit 200 (FIG. 22) of the drilling tool 1 relative to the workpiece W. As will become apparent, the guide assembly 14 receives and guides movement of the drill bit 200 during the operation of the jig 10 to cut the mortise M in the workpiece W. The guide assembly 14, in general and during the cutting of the mortise M, controls the movement of the drill bit 200 along an x-axis to create the length of the mortise, inhibits the movement of the drill bit along a z-axis, and controls the movement of the drill bit along a y-axis to create the depth of the mortise. By inhibiting movement of the drill bit 200 along the z-axis, the width of the mortise M is set by the size of the drill bit.

Figure 10:
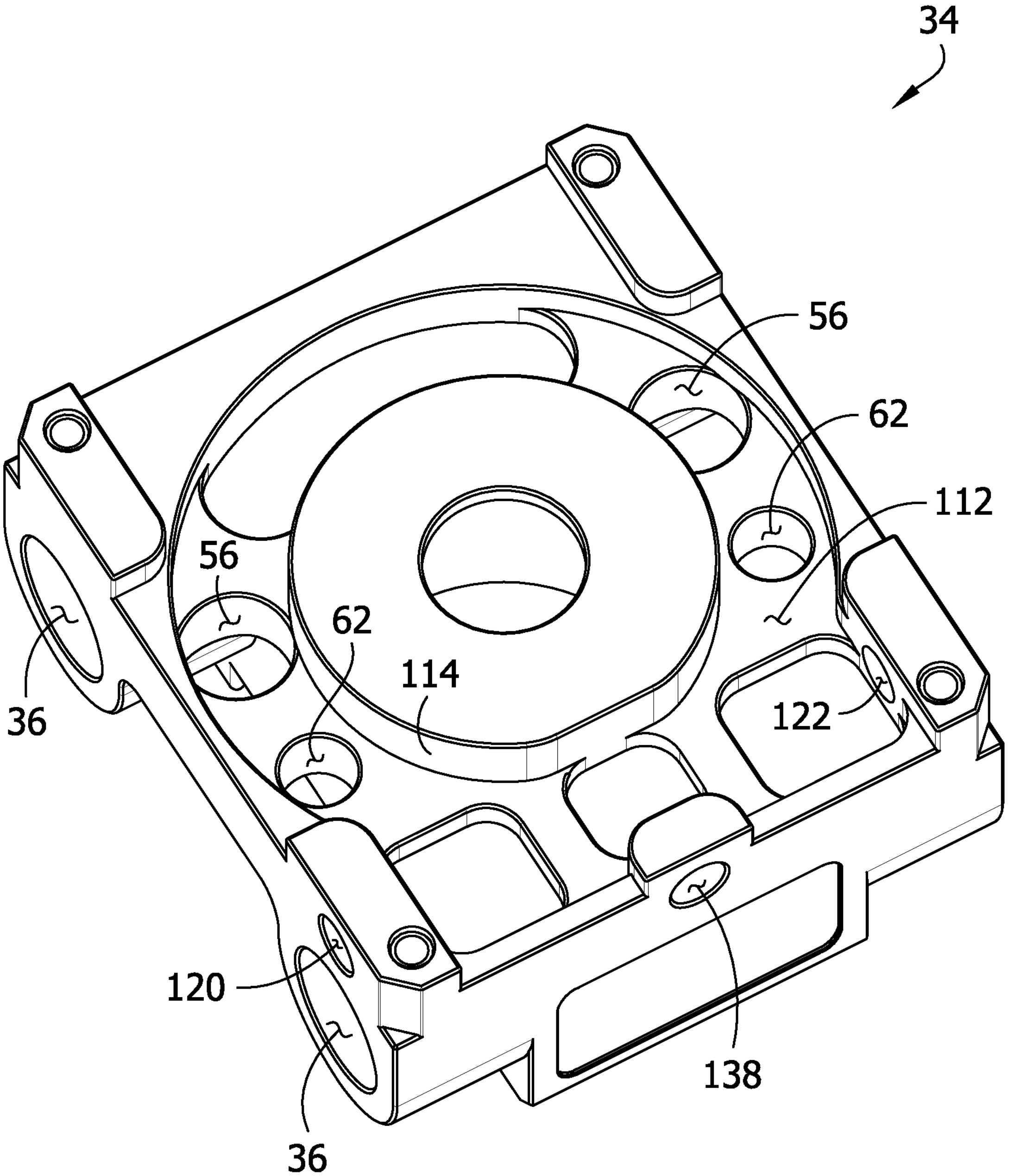
FIG. 10 is a perspective of a guide block of the guide.
Figure 15:
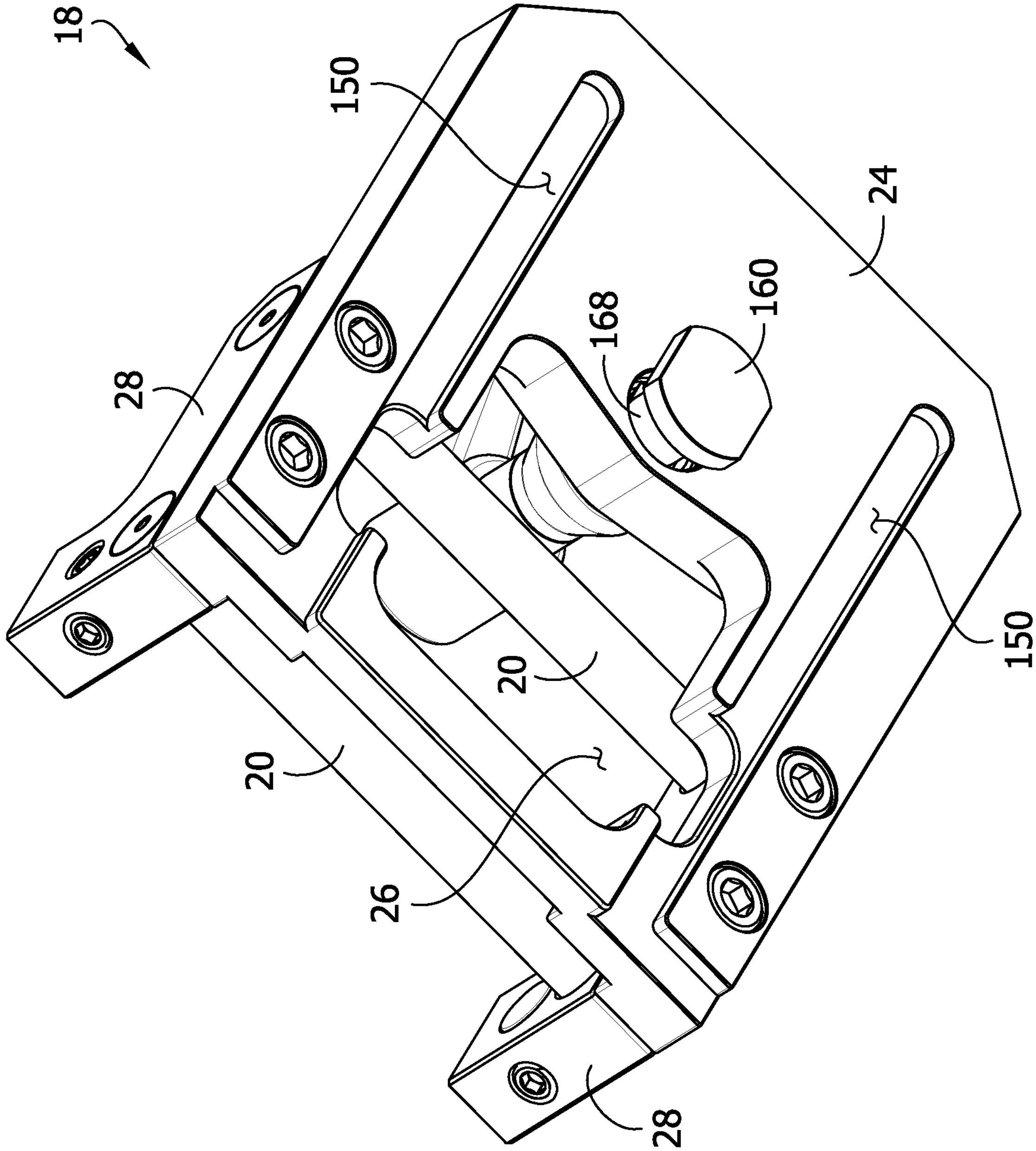
FIG. 15 is a bottom perspective of a guide base.
Figure 16:
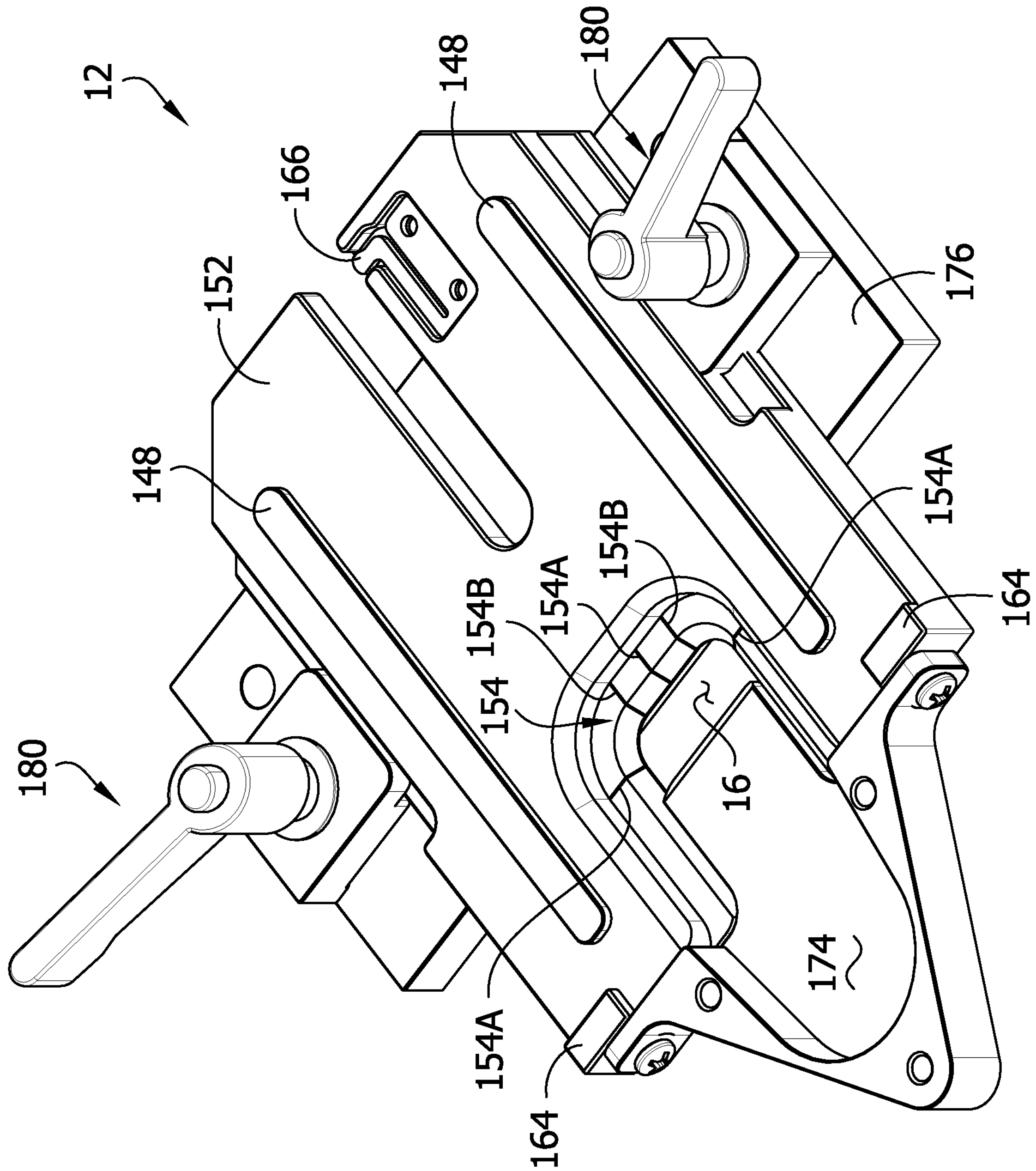
FIG. 16 is a top perspective of a base.
Figure 17:
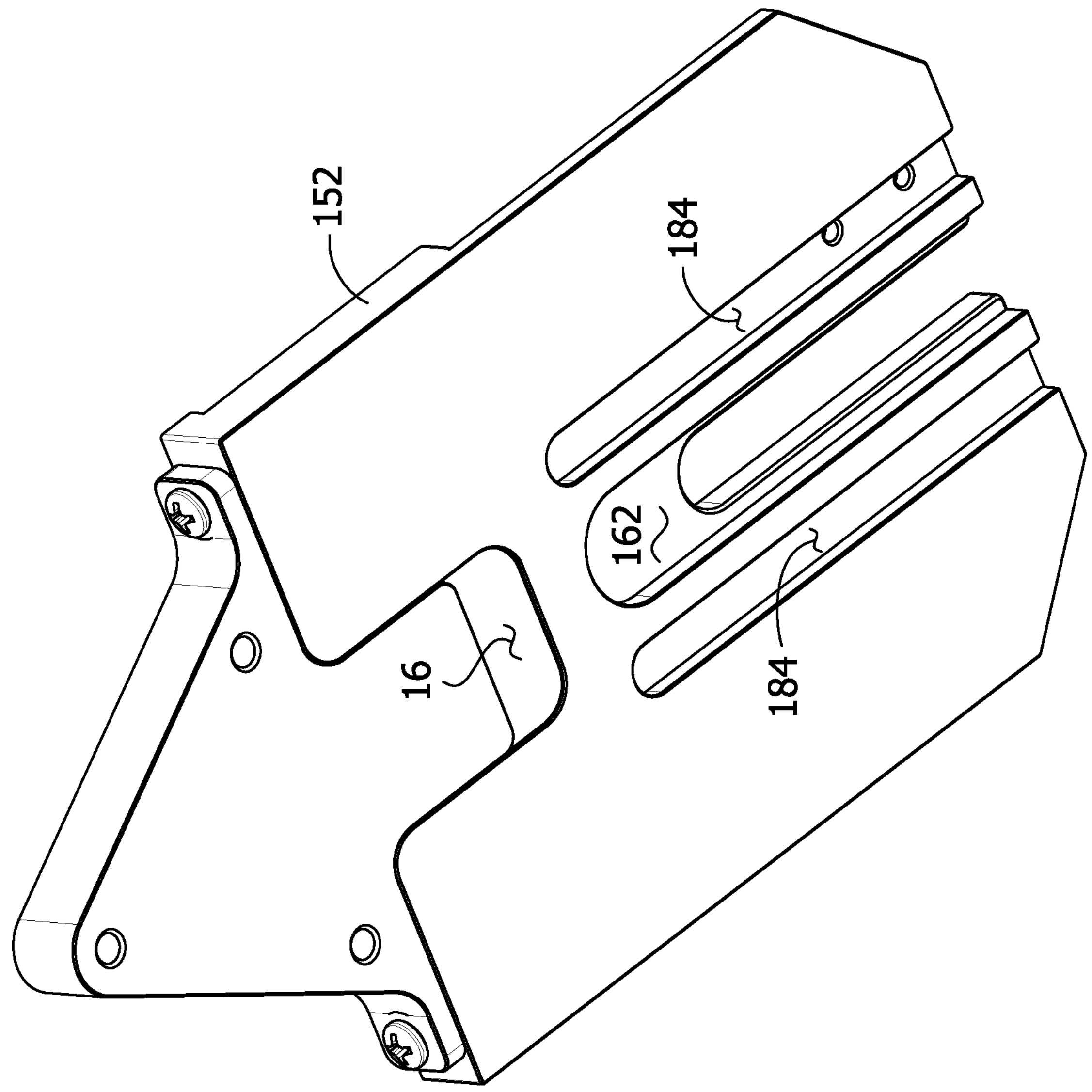
FIG. 17 is a bottom perspective of a base plate.

The guide assembly 14 includes a guide support or base 18, two guide rails 20 (broadly, at least one guide rail), and a guide 22. The guide base 18 includes a guide plate 24 supported by and moveably (e.g., slideably) attached to the base 12. The guide plate 24 include a guide aperture or opening 26 (FIG. 15) for receiving the drill bit 200 through the guide plate. The guide opening 26 also provides clearance between the guide plate 24 and the guide 22 to permit the guide to move relative to the guide plate. The guide base 18 supports the guide rails 20. The guide base 18 includes two rail supports or blocks 28 extending upward from the guide plate 24. The two guide rails 20 are connected to the rail supports 28, and extend over the guide plate 24. The two guide rails 20 are generally parallel to the x-axis. The guide 22 receives and guides the drill bit 200 during the operation of the jig 10. The guide 22 includes a guide carriage 30 and a drill bit support 32. The guide carriage 30 is movably mounted on the guide rails 20 for movement along the guide rails. The guide carriage 30 includes a guide block or housing 34 (FIG. 10) having two bores or passages 36 extending therethrough. Slide bearings or bushings 38 are disposed in the opposite ends of the passages 36. Each guide rail 20 extends through one of the passages 36, with the slide bearings 38 providing a low friction mounting permitting the guide carriage 30 to slide back and forth on the guide rails, along the x-axis.

Referring to FIGS. 5, 6, and 21A-B, the guide carriage 30 generally controls the movement of the drill bit 200 along the x-axis and inhibits movement of the drill bit 200 along the z-axis. The guide carriage 30 has a first drill bit opening 40 sized and shaped to receive the drill bit 200. The first drill bit opening 40 has a longitudinal axis LA (e.g., a longitudinal y-axis). The longitudinal axis LA is coextensive with an axis of rotation AR about which the drill bit 200 rotates when the drill bit is disposed or received in the drill bit opening 40. In the illustrated embodiment, the first drill bit opening 40 is defined by a sleeve 42 generally extending through the guide block 34. The sleeve 42 is generally tubular and is connected to the guide block 34 with two bearings 44. The bearings 44 permit the sleeve 42 to rotate with the drill bit 200 when the drill bit is rotated by the drilling tool 1 to cut the mortise M. The sleeve 42 is of a sufficient length to sufficiently brace the drill bit 200 laterally to resist the forces (e.g., moment forces) exerted on the drill bit 200 during operation of the jig 10. The first drill bit opening 40 is aligned with the guide opening 26 in the guide plate 24 and the cutting window 16 in the base 12, regardless of the position the guide carriage 30 is at on the guide rails 20.

Referring to FIGS. 5-8, the drill bit support 32 is arranged to move conjointly with the guide carriage 30 as the guide carriage moves along the guide rails 20. In the illustrated embodiment, the drill bit support 32 is supported by and movable relative to the guide carriage 30 along the axis of rotation AR. The drill bit support 32 includes a second drill bit opening 48 sized and shaped to receive the drill bit 200. The second drill bit opening 48 is aligned (along the y-axis) with the first drill bit opening 40 such that the drill bit 200 extends through both drill bit openings when received by the guide 22 (e.g., the longitudinal axis LA of the first drill bit opening is coextensive with a longitudinal axis of the second drill bit opening). The drill bit support 32 includes a rest 50 (e.g., a rest surface) arranged to locate the drill bit 200 relative to the guide carriage 30 and relative to the workpiece W. The rest 50 is arranged to engage and support the drill bit 200 to control the vertical positioning (e.g., positioning along the y-axis) of the drill bit relative to the workpiece W. In the illustrated embodiment, the rest 50 circumferentially surrounds the second drill bit opening 48. In the illustrated embodiment, the drill bit support 32 includes a bearing 52 which defines the second drill bit opening 48 and the rest 50. The drill bit support 32 includes a drill bit support housing 46. The bearing 52 is mounted on the drill bit support housing 46. The drill bit support 32 includes first and second rods or posts 54 (broadly, supports). The posts 54 are fixed to the drill bit support housing 46 and extend downwardly therefrom. The posts 54 are movably (e.g., slideably) connected to the guide carriage 30. The guide block 34 includes openings 56 (e.g., post openings) extending therethrough. The posts 54 are free to slide vertically within the openings 56. Each posts 54 includes a stop 58 (e.g., flange) at the lower end. The stops 58 engage the guide block 34 to limit the upward movement of the drill bit support 32 relative to the guide carriage 30. Similar to the sleeve 42, the openings 56 are of a sufficient length to sufficiently brace the posts 54 laterally to resist the forces (e.g., moment forces) exerted on the drill bit support 32 during operation of the jig 10. The drill bit support 32 also includes first and second indexing guides 60. The first and second indexing guides 60 are fixed to the drill bit support housing 46 and extend downwardly therefrom. The indexing guides 60 operate with an indexer (described in more detail below) to control the movement of the drill bit support 32 relative to the guide carriage 30. In addition, the indexing guides 60 also facilitate the connection between the drill bit support 32 and the guide carriage 30. In the illustrated embodiment, the first and second indexing guides 60 generally have a rod or post shape. Like the posts 54, the indexing guides 60 are movably (e.g., slideably) connected to the guide carriage 30. The guide block 34 includes openings 62 (e.g., post openings) extending therethrough. The indexing guides 60 are free to slide vertically within the openings 62. Like the openings 56, the openings 62 for the indexing guides 60 also brace the indexing guides laterally to assist in resisting the forces exerted on the drill bit support 32 during operation of the jig 10.

As is apparent, the drill bit support 32 is movable relative to the guide carriage 30. In particular, the drill bit support 32 is movable along the y-axis relative to the guide carriage 30. As a result of this movement, a distance D (FIG. 14A) between the rest 50 and the guide carriage 30 (and hence the workpiece W) changes. In the illustrated embodiment, the distance D is measured from the rest 50 to an upper surface of the guide carriage 30 disposed directly below the rest, although it is understood the distance could be taken from other locations on the guide carriage 30. During operation of the jig 10, the drill bit support 32 starts at an initial or raised position (shown in FIGS. 5 and 6), where the rest 50 is the furthest from the guide carriage 30. As described in more detail below, during the operation of the jig 10, the drill bit support 32 moves toward the carriage 30. As a result, the drill bit 200 moves toward and into engagement with the workpiece W to cut the mortise M. The closer the drill bit support 32 moves toward the guide carriage 30, the deeper the mortise M cut by the drill bit 200.

Figure 8:
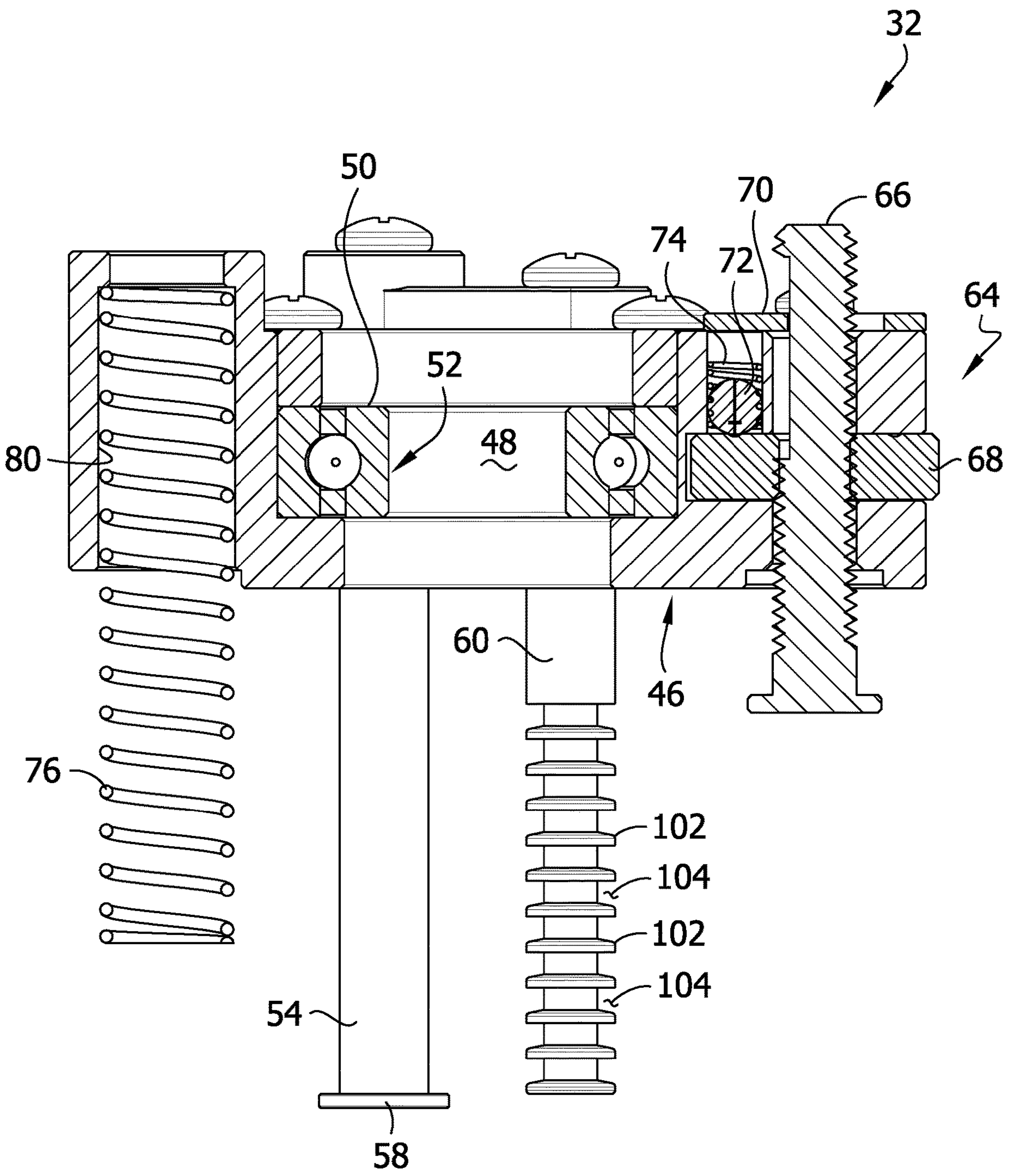
FIG. 8 is a vertical section of the drill bit support.

Referring to FIG. 8, the guide 22 includes a depth stop 64. In the illustrated embodiment, the depth stop 64 is part of the drill bit support 32. The depth stop 64 is configured to set or limit the depth of the mortise M cut by the drill bit 200. Generally, the depth stop 64 sets or limits the movement of the drill bit 200 along the y-axis relative to the guide carriage 30 and the workpiece W. In particular, the depth stop 64 is arranged to engage the guide carriage 30 (e.g., a top cover or plate of the guide block 34) to set or limit the depth of the mortise M. In the illustrated embodiment, the depth stop 64 includes a stop 66 (e.g., fastener such as a bolt), an actuator 68, and a key 70. The stop 66 includes exterior threads that threadably mate with interior threads of the actuator 68. The actuator 68 comprises a rotary disk or nut. The key 70 includes a flat that engages a flat along a shaft of the stop 66 to inhibit the stop from rotating with the actuator 68 when the actuator is rotated (broadly, actuated). The stop 66 is arranged such that it (e.g., a head thereof) will engage the guide carriage 30 when the drill bit support 32 moves close enough to the guide carriage, thereby preventing further movement of the drill bit support 32 toward the guide carriage (e.g., the drill bit support 32 is in an end position relative to the guide carriage). Rotating the actuator 68 in one direction moves the stop 66 toward the guide carriage 30 to decrease the depth of the mortise M that will be cut and rotating the actuator in the opposite direction moves the stop away from the guide carriage to increase the depth of the mortise that will be cut. In the illustrated embodiment, the depth stop 64 includes a detent 72, biased toward the actuator 68 with a spring 74. The detent 72 engages recesses in the actuator 68 to inhibit unintentional movement of the actuator 68. The actuator 68 may include a plurality (e.g., eight) recesses circumferentially spaced apart around the threaded opening of the actuator. In addition to preventing unintentional movement, the plurality of recesses also allow the actuator 68 to be moved (e.g., rotated) by discrete, set amounts to adjust the depth stop 64. Other configurations of the depth stop are within the scope of the present disclosure. For example, the depth stop could be incorporated into the guide carriage instead of the drill bit support.

Still referring to FIGS. 5-8, the guide 22 includes a return spring 76. The return spring 76 biases the drill bit support 32 (e.g., the rest 50) away from the guide carriage 30 and assists in returning the drill bit support to the initial position after the jig 10 has cut a mortise M. The return spring 76 has one end engaged with the drill bit support 32 and another end engaged with the guide carriage 30. In the illustrated embodiment, the return spring 76 comprises a coil spring. A guide pin 78, attached to and extending upward from the guide block 34, extends into a portion of the coil spring 76 to inhibit the coil spring from deflecting laterally when compressed. In the illustrated embodiment, the drill bit support housing 46 defines an opening 80 (FIG. 8) sized and shaped to receive the guide pin 78. The upper portion of the coil spring 76 is also disposed in the opening 80.

Referring back to FIGS. 1-3, the jig 10 includes an actuator 82 operatively connected to the guide 22 to selectively move the guide along the guide rails 20, with respect to the guide base 18, for cutting the mortise M in the workpiece W with the drill bit 200. In the illustrated embodiment the actuator 82 comprises a lever 84. One end of the lever 84 includes a handle 86 and the opposite end of the lever is pivotably connected to the guide carriage 30 with a fastener 88 (e.g., bolt). The lever 84 includes an opening 90 between the two ends through which a fastener 92 (e.g., bolt) extends to pivotably coupled the lever to the guide base 18 (e.g., one of the rail support 28 thereof). The fastener 92 defines a pivot axis PA about which the lever 84 pivots in both directions to move the guide 22 along the guide rails 20. The opening 90 is oversized to permit the lever 84 to also move linearly relative to the fastener 92 to compensate for the slight change in distance between the pivot axis PA and the fastener 88 that occurs as the guide 22 moves back and forth along the guide rails 22. In one embodiment, the opening 90 comprises a slightly elongated slot. Other forms of actuators are within the scope of the present disclosure, such as those described in U.S. Pub. No. 2009/0272463.

The lever 84 is operatively connected to the guide 22 (specifically, the guide carriage 30) such that rocking motion of the lever produces linear reciprocating motion of the guide (and therefore the drill bit 200) on the guide rails 20. An operator grasps the handle 86 and rocks or rotates the handle back and forth to produce the reciprocating movement of the guide 22 along the guide rails 20. Thus, the linear reciprocating motion of the guide 22 comprises a series of strokes in alternating directions (e.g., a first direction and an opposite second direction). A stroke is the movement of the guide 22 in one direction along the guide rails from generally one end of the guide rails 20 to the other end of the guide rails. In other words, a stoke is the movement of the guide from generally one rail support 28 to the other rail support 28. The rail supports 28 limit the movement of the guide 22 in the alternating directions. In other words, the rail supports 28 act as stops which stop the movement of the guide 22 at the end of each stroke. As a result, the length of the travel of the guide 22 (and hence the length of the mortise M) is defined by the rail supports 28. Pivoting the lever 84 about the pivot axis PA in one direction moves the guide 22 along the guide rails 20 in one stroke and then pivoting the lever about the pivot axis in the opposite direction moves the guide along the guide rails in another stroke. The operator repeatedly moves the lever 84 in the alternating pivot directions to repeatedly move the guide 22 through the series of strokes. During operation, the guide 22 may complete (e.g., move through) 5, 10, 15, or 20 or more strokes when cutting the mortise M in the workpiece W. Generally, the mortise M will be cut in about 10-15 strokes of the guide 22 (e.g., a cutting cycle comprises about 10-15 strokes).

The jig 10 is configurable in either a left-hand arrangement or a right-hand arrangement. Specifically, the lever 84 is configurable in either a left-hand arrangement or a right hand arrangement. In the illustrated embodiment, the lever 84 is disposed on the right side of the jig 10 (when facing the front of the jig), which corresponds to the right-hand configuration. In this position, the lever 84 is engaged by the right hand of the operator to pivot the lever back and forth. If desired, the lever 84 can be moved over to the left side of the jig 10, which corresponds to the left-hand configuration. In this position (not shown), the lever 84 is engaged by the left hand of the operator to pivot the lever back and forth. To move the lever 84 between the left and right hand configurations, the operator unscrews the fasteners 88, 92 connecting the lever to the right rail support 28 and right side of the guide carriage 30, and moves the lever over the left side of the jig 10, reconnecting the lever to the left rail support and the left side of the guide carriage using the same fasteners. It is appreciated, that the guide carriage 30 and rail supports 28 have corresponding threaded openings for the fasteners 88, 90 on each of the left and right sides of the jig 10 to permit the operator to move the lever to the desired configuration.

Referring to FIGS. 9A-13B, the jig 10 includes an indexer 94 (e.g., indexing mechanism). The indexer 94 is arranged to control the movement of the drill bit support 32 (specifically, the rest 50) relative to the guide carriage 30, thereby controlling the movement (e.g., depth) of the drill bit 200 into the workpiece W. The indexer is arranged to control the movement of the drill bit support 32 relative to the guide carriage 30 to change the distance D between the rest 50 and the guide carriage 30 by discrete increments. More specifically, the indexer 94 controls the movement of the drill bit support 32 toward the guide carriage 30. Accordingly, the indexer 94 is arranged to control the movement of the drill bit support 32 toward the guide carriage 30 to decrease the distance D between the rest 50 and guide carriage 30 by the discrete increments. In one embodiment, the discrete increments are each within the inclusive range of about 0.01 inch (about 0.25 mm) to about 0.25 inch (about 6.4 mm), or preferably within the inclusive range of about 0.01 inch (about 0.25 mm) to about 0.1 inch (about 2.5 mm), or more preferably within the inclusive range of about 0.03 inch (about 0.76 mm) to about 0.07 inch (about 1.8 mm), or more preferably about 0.05 inch (about 1.3 mm).

Figure 7:
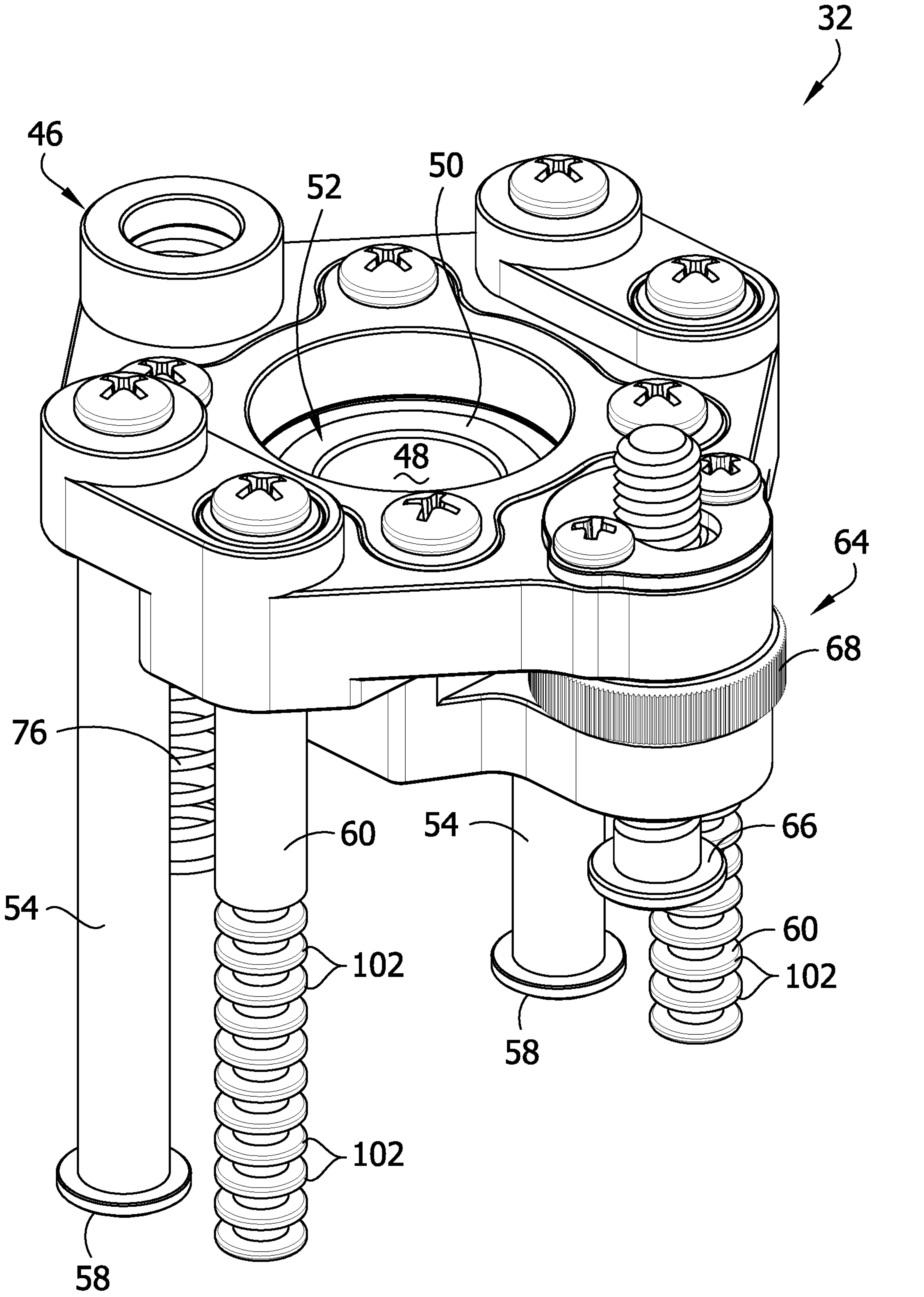
FIG. 7 is a perspective of a drill bit support of the guide.

The indexer 94 includes a first indexing member or plate 96 and a second indexing member or plate 98. In the illustrated embodiment, the first and second indexing members 96, 98 are generally mirror images of one another. Each indexing member 96, 98 includes at least one stop 100. In the illustrated embodiment, each indexing member 96, 98 includes two stops 100. Each stop 100 engages the drill bit support 32 to inhibit the drill bit support from moving relative to the guide carriage 30. Each stop 100 is arranged to engage one of the indexing guides 60 of the drill bit support 32. As shown in FIGS. 7 and 8, each indexing guide 60 includes a plurality of ridges or flanges 102 spaced apart along the longitudinal axis of the respective indexing guide. The flanges 102 define a plurality of circumferential channels 104 therebetween. Each stop 100 selectively moves into and out of the channels 104 to engage and disengage the flanges 102 to control the movement of the indexing guides 60 (and thereby the drill bit support 32) relative to the guide carriage 30. In the illustrated embodiment, each indexing member 96, 98 defines two indexing guide openings 106. Each indexing guide opening 106 includes a first section 106A sized and shaped to permit the indexing guide 60 to move therethrough (e.g., a diameter of the first section is larger than the diameter of the flanges 102). Each indexing guide opening 106 also includes a second section 106B sized and shaped such that the indexing guide 60 cannot move therethrough (e.g., a diameter of the second section is smaller than the diameter of the flanges 102). In this embodiment, the portions of the indexing members 96, 98 surrounding (e.g., bounding) the second section 106B of the indexing guide opening 106 define the stops 100. For reasons that will become apparent, for the first indexing member 96, the second section 106B is placed on one side (e.g., a counter-clockwise side relative to the first section) of the first section 106A for each indexing guide opening 106 and for the second indexing member 98, the second section is place on the other side (e.g., a clockwise side relative to the first section) of the first section for each indexing guide opening. Each indexing member 96, 98 also includes two post openings 108 sized and shaped to permit the posts 54 of the drill bit support 32 to extend (and move) therethrough. Each indexing member 96, 98 also includes a large central opening 110.

The indexing members 96, 98 are movable relative to the guide carriage 30. Specifically, the indexing members 96, 98 are pivotable about the longitudinal axis LA of the first drill bit opening 40. The guide block 34 defines an indexer receiving space 112 in which the first and second indexing members 96, 98 are disposed. The guide block 34 includes a pivot guide or cylindrical wall 114 which extends through the central openings 110 of each indexing member 96, 98. The indexing members 96, 98 engage and pivot about the cylindrical wall 114. The openings 56 in the guide block 34 underlie the post openings 108 of the first and second indexing members 96, 98. Likewise, the openings 62 in the guide block 34 underlie the indexing guide openings 106 of the first and second indexing members 96, 98.

Figure 9A:
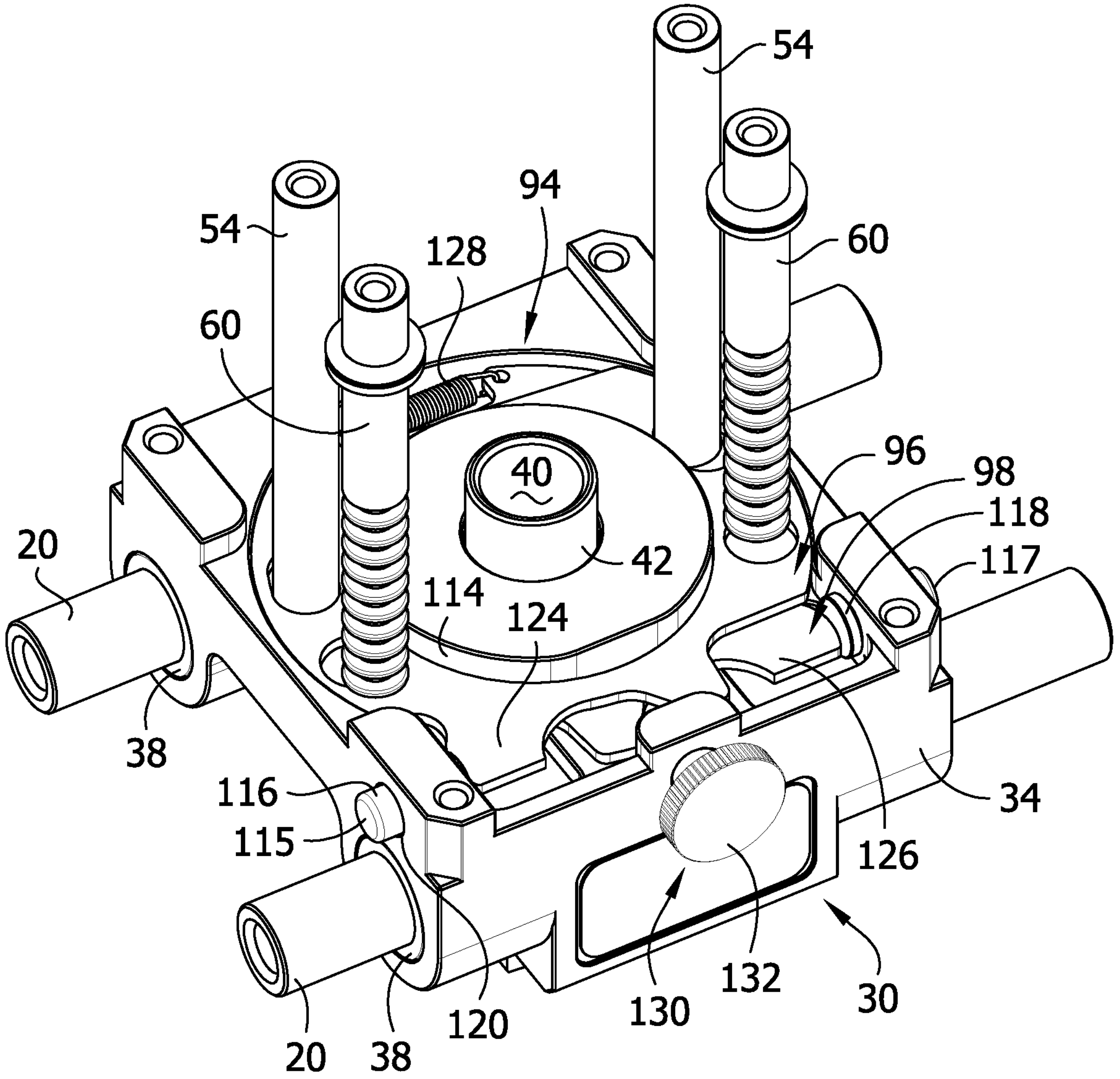
FIG. 9A is a front perspective of the guide with portions thereof removed to reveal interior details and with an indexer in its retaining position.
Figure 9B:
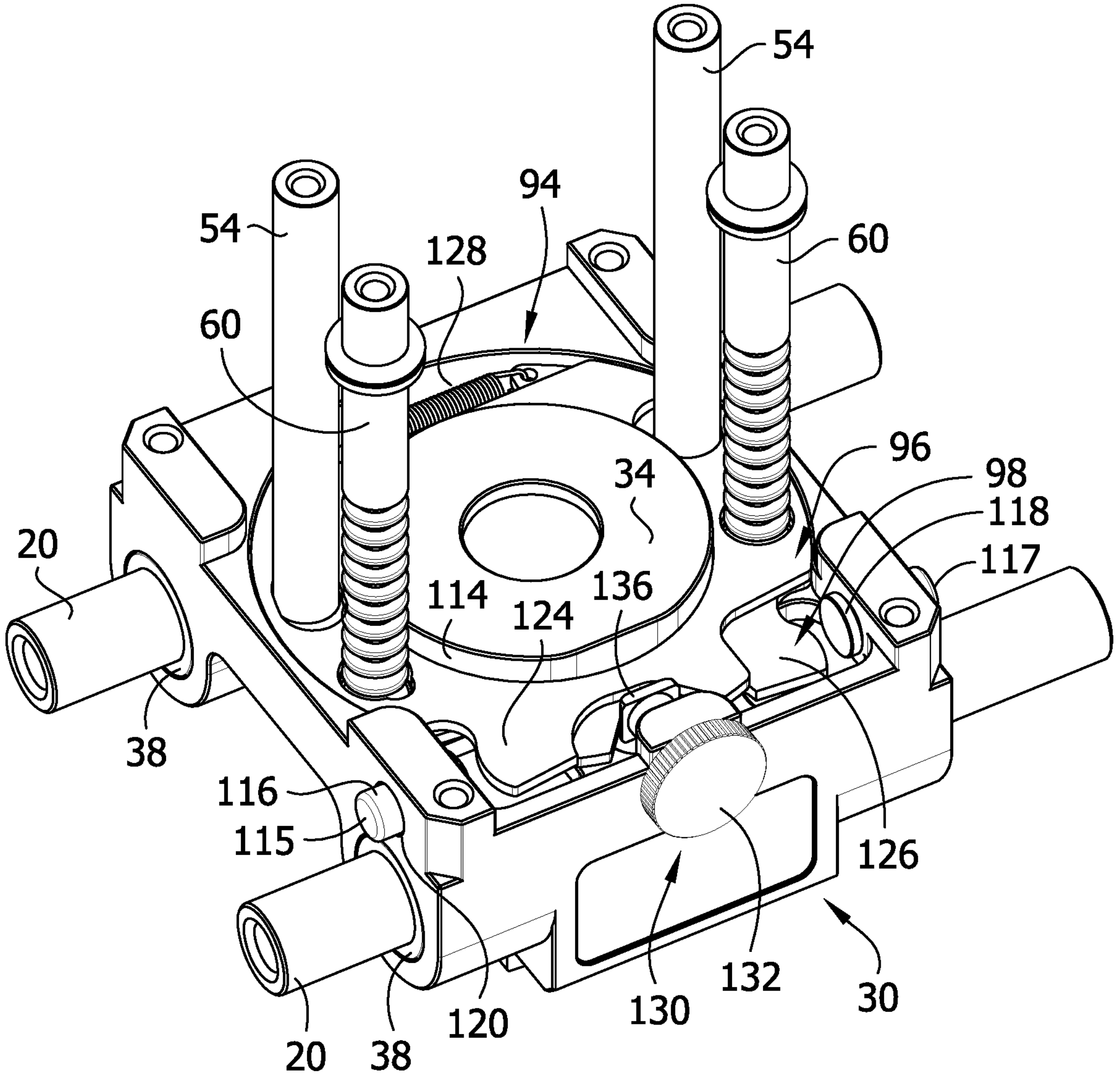
FIG. 9B is similar to FIG. 9A, except the indexer is in its release position
Figure 11:
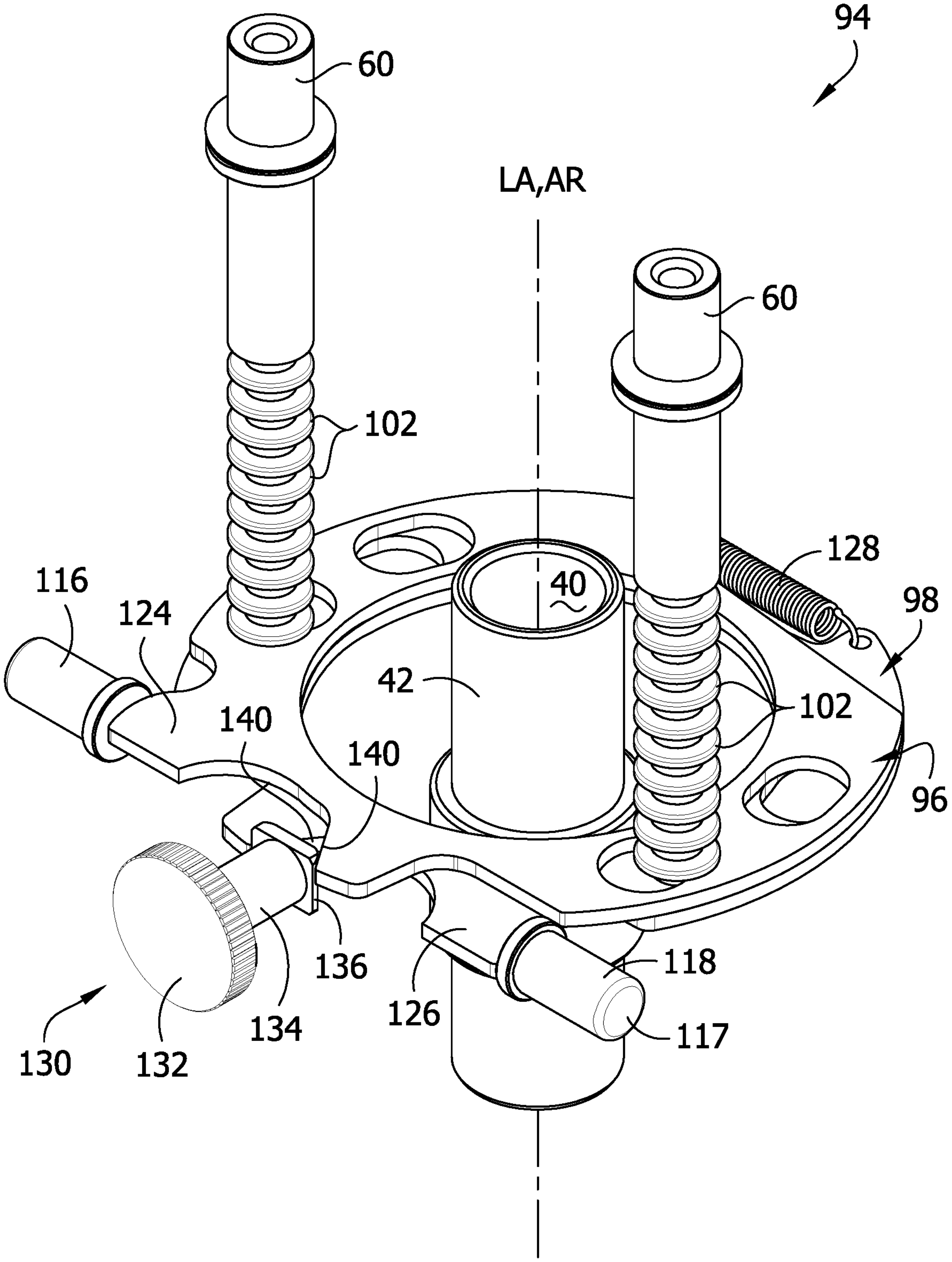
FIG. 11 is a front perspective of the indexer, with first and second indexing members in their respective retaining positions.
Figure 12:
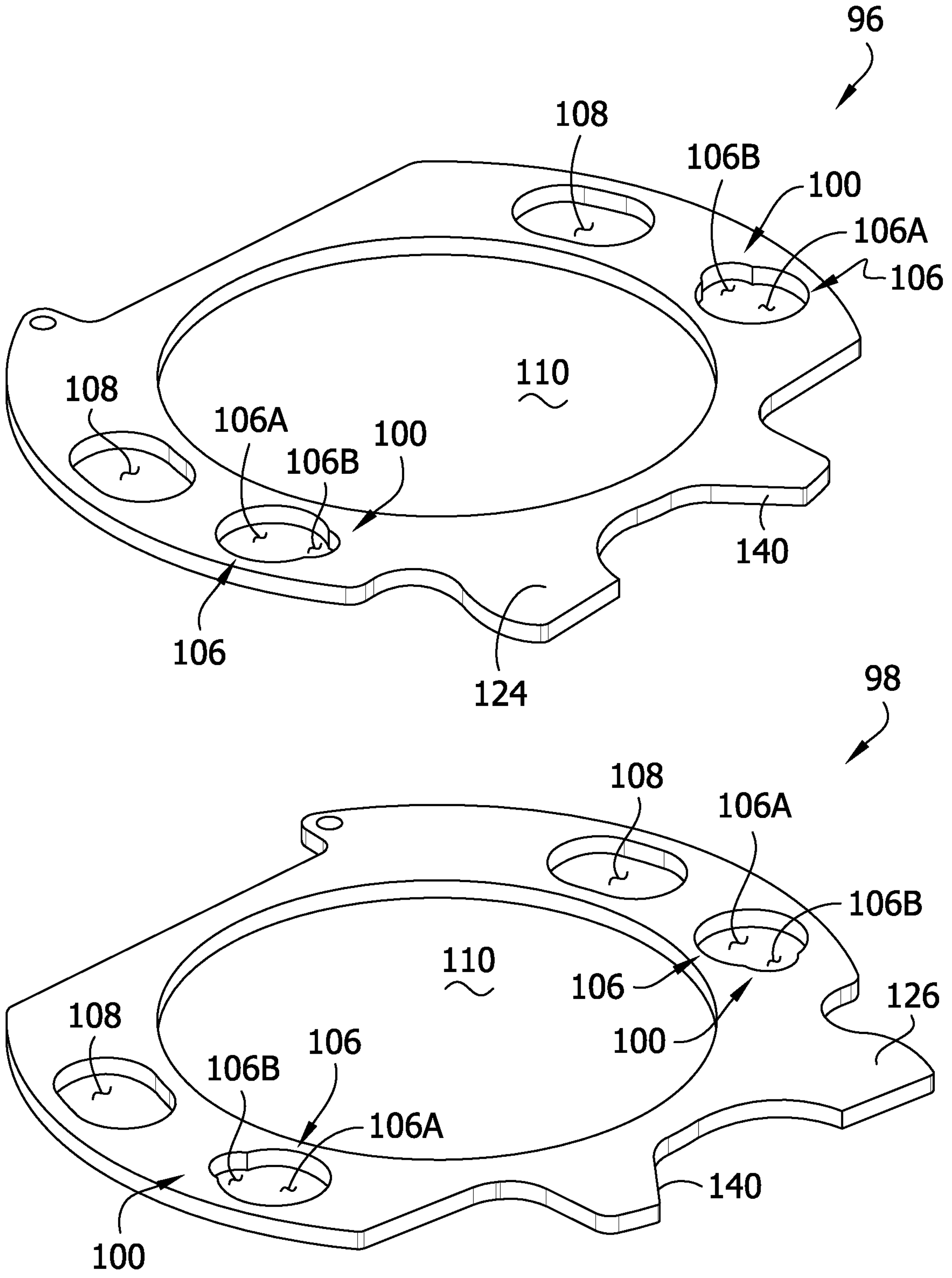
FIG. 12 is an exploded perspective of the first and second indexing members.
Figure 13A:
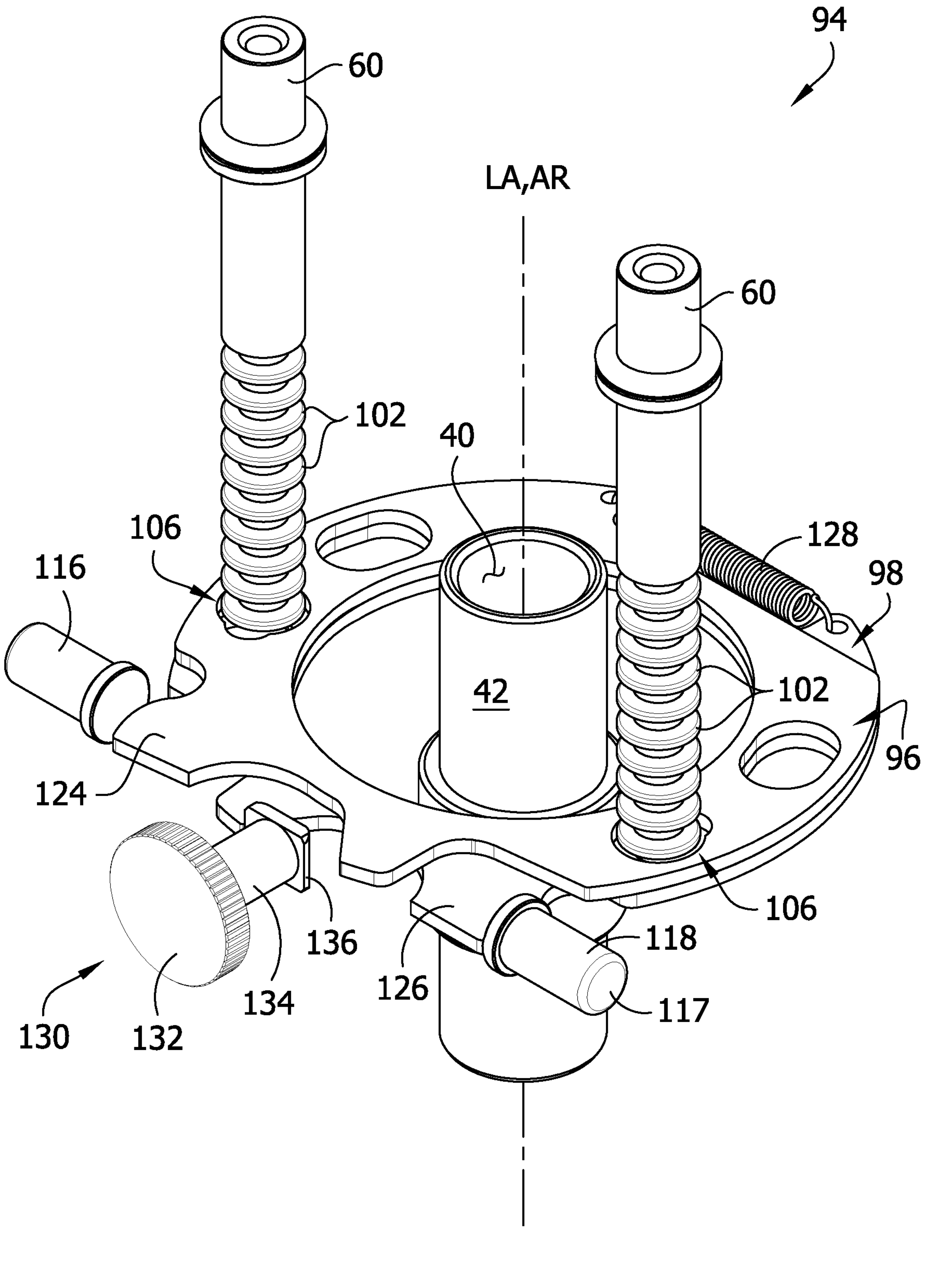
FIG. 13A is a front perspective of the indexer, with the first indexing member in its release position and the second indexing member in its retaining position.
Figure 13B:
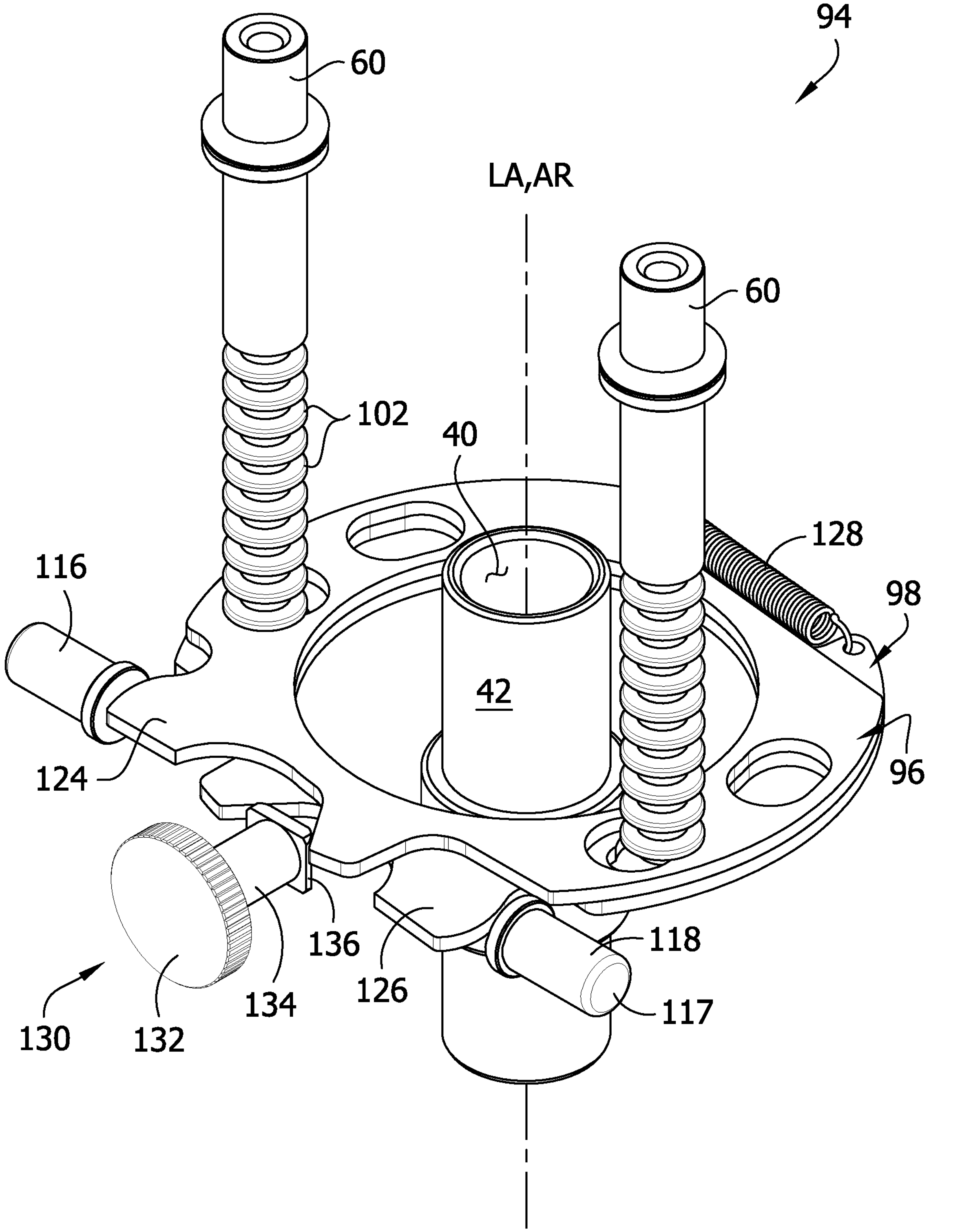
FIG. 13B is a front perspective of the indexer, with the first indexing member in its retaining position and the second indexing member in its release position.

The indexing members 96, 98 (broadly, the stops 100) are each moveable between a first or release position and a second or retaining position. FIGS. 9A, 11, and 13B show the first indexing member 96 in its retaining position. FIGS. 9B and 13A show the first indexing member 96 in its release position. FIGS. 9A, 11, and 13A show the second indexing member 98 in its retaining position. FIGS. 9B and 13B show the second indexing member 98 in its release position. The indexing members 96, 98 rotate or pivot (about the longitudinal axis LA and the cylindrical wall 114) between their respective release and retaining positions. The first and second indexing members 96, 98 are each movable independent of the other indexing member. For example, the first indexing member 96 can move between its release and retaining positions regardless of what position the second indexing member 98 is in, and vice versa for the second indexing member.

When in their respective release positions, the first and second indexing members 96, 98 are each arranged to permit the movement of the drill bit support 32 relative to the guide carriage 30. Specifically, the stops 100 of each indexing member 96, 98 are arranged to not engage the drill bit support 32 (specifically, one of the indexing guides 60) to permit the movement of the drill bit support relative to the guide carriage 30. The first sections 106A of the indexing guide openings 106 are aligned with the indexing guides 60 to permit the indexing guides to move therein. In other words, the stops 100 are positioned such that they will not engage any of the flanges 102 of the indexing guides 60 to permit the movement of the drill bit support 32 along the y-axis.

When in their respective retaining positions, the first and second indexing members 96, 98 are each arranged to inhibit the movement of the drill bit support 32 relative to the guide carriage 30. Specifically, the stops 100 of each indexing member 96, 98 are arranged to engage and inhibit the movement of the drill bit support 32 (specifically, one of the indexing guides 60) relative to the guide carriage 30. The second sections 106B of the indexing guide openings 106 are aligned with the indexing guides 60. As a result, the stops 100 are positioned (e.g., disposed in a channel 104) such that they will engage one of the flanges 102 (e.g., an underside or upper side thereof) of the indexing guides 60 to inhibit movement of the drill bit support 32 along the y-axis.

Figure 5:
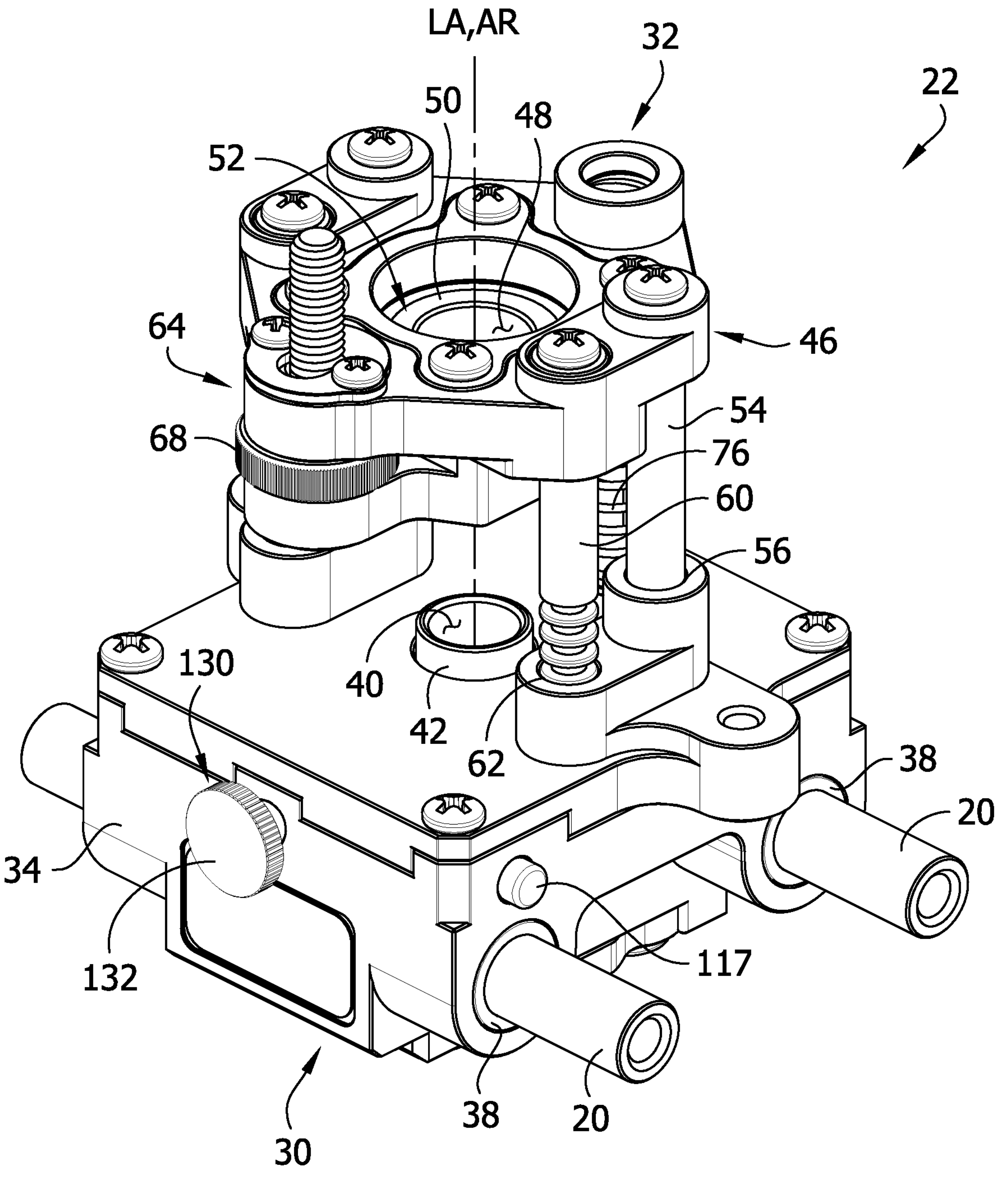
FIG. 5 is a front perspective of the guide.
Figure 6:
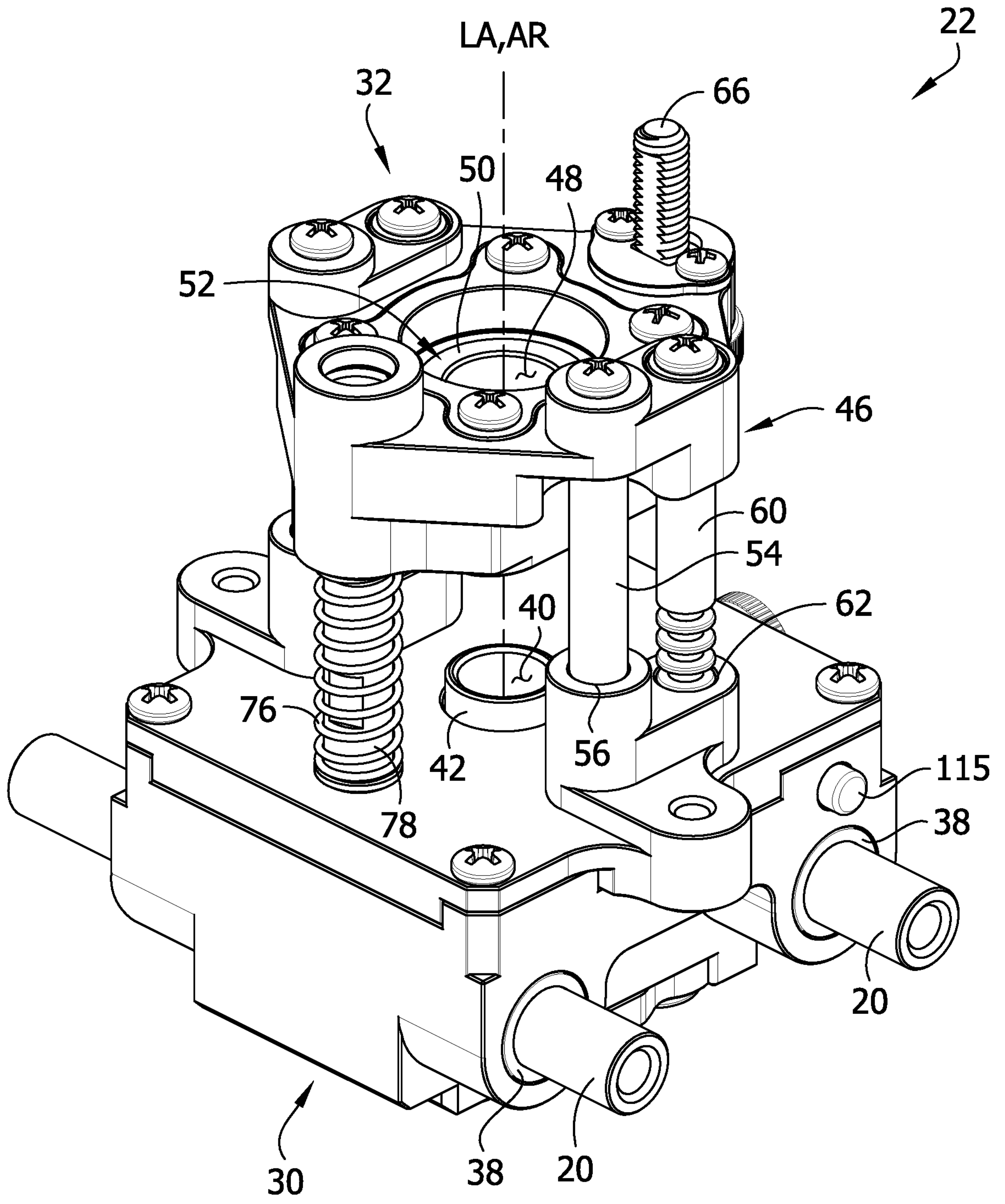
FIG. 6 is a rear perspective of the guide.

The indexer 94 selectively permits the movement of the drill bit support 32 relative to the guide carriage 30 based on the position of the guide 22 on the guide rails 20. In the illustrated embodiment, the indexer 94 permits the drill bit support 32 to move toward the guide carriage 30 when the guide 22 is disposed at either ends of the guide rails 20. That is, the indexer 94 is arranged to permit the movement of the drill bit support 32 relative to the guide carriage 30 when the guide carriage is generally at the end of each stroke. Moreover, the indexer 94 is arranged to inhibit the movement of the drill bit support 32 relative to the guide carriage 30 during each stroke prior to the guide carriage being generally at the end of each stroke. In the illustrated embodiment, the indexer 94 is arranged to engage one of the rail supports 28 generally at the end of each stroke to actuate the indexer 94 and permit the drill bit support 32 to move toward the guide carriage 30. The indexer 94 includes a first engagement surface 115 (FIG. 6) and a second engagement surface 117 (FIG. 5). The first indexing member 96 (broadly, the stops 100 thereof) is operatively coupled to the first engagement surface 115 such that movement of the first engagement surface drives movement of the first indexing member (e.g., moves the first indexing member from the retaining position to the release position). The first engagement surface 115 is arranged to engage the guide base 18 (specifically, the left rail support 28) to actuate the indexer 94 to permit the movement of the drill bit support 32 when the guide carriage 30 is generally at the end of each stroke (e.g., each leftward stroke) in a first or leftward direction. Specifically, the first engagement surface 115 is disposed proud of the guide block 34 such that when the guide carriage 30 is generally at the end of the leftward stroke, the first engagement surface 115 engages and is moved rightward by (relative to the guide carriage 30) the guide base 18. As a result of this movement of the first engagement surface 115, the first indexing member 96 pivots counter-clockwise about the cylindrical wall 114 from its retaining position to its release position. Similarly, the second indexing member 98 (broadly, the stops 100 thereof) is operatively coupled to the second engagement surface 117 such that movement of the second engagement surface drives movement of the second indexing member (e.g., moves the second indexing member from the retaining position to the release position). The second engagement surface 117 is arranged to engage the guide base 18 (specifically, the right rail support 28) to actuate the indexer 94 to permit the movement of the drill bit support 32 when the guide carriage 30 is generally at the end of each stroke (e.g., each rightward stroke) in a second or rightward direction. Specifically, the second engagement surface 117 is disposed proud of the guide block 34 such that when the guide carriage 30 is generally at the end of the rightward stroke, the second engagement surface 117 engages and is moved leftward by (relative to the guide carriage 30) the guide base 18. As a result of this movement of the second engagement surface 117, the second indexing member 98 pivots clockwise about the cylindrical wall 114 from its retaining position to its release position.

The indexer 94 includes a first button or pin 116 and a second button or pin 118. The first and second buttons 116, 118 are each supported by and movable (e.g., slideable) relative to guide block 34. The first button 116 defines (e.g., includes) the first engagement surface 115. The first button 116 slides linearly within an opening 120 in the guide block 34. A head of the first button 116 is arranged to contact and move an arm 124 of the first indexing member 96 when the first engagement surface 115 is engaged and moved by the guide base 18. This engagement pivots the first indexing member 96 from the retaining position toward the release position. Similarly, the second button 118 defines the second engagement surface 117. The second button 118 slides linearly within an opening 122 in the guide block 34. A head of the second button 118 is arranged to contact and move an arm 126 of the second indexing member 98 when the second engagement surface 117 is engaged and moved by the guide base 18. This engagement pivots the second indexing member 98 from the retaining position toward the release position.

The indexer 94 includes an indexing spring 128. The indexing spring 128 biases the first and second indexing members 96, 98 (broadly, the stops) toward their respective retaining positions. In the illustrated embodiment, the indexing spring 128 biases or urges the first and second indexing member 96, 98 to rotate in opposite directions. The indexing spring 128 includes one end attached to the first indexing member 96 and an opposite end attach to the second indexing member 98. The indexing spring 128 also biases the first and second buttons 116, 118 outward (e.g., biases the first and second engagement surfaces 115, 117 to be proud of the guide block 34) via the respective arms 124, 126 of the first and second indexing members 96, 98. An engagement between the head of the first button 116 and the guide block 34 limits how far the first indexing member 96 can rotate in the clockwise direction from the release position to the retaining position (due to a force from the indexing spring 128). Generally, the head of the first button 116 is engaged with the guide block 34 when the first indexing member 96 is in its retaining position. Likewise, an engagement between the head of the second button 118 and the guide block 34 limits how far the second indexing member 98 can rotate in the counter-clockwise direction from the release position to the retaining position (due to a force from the indexing spring 128). Generally, the head of the second button 118 is engaged with the guide block 34 when the second indexing member 98 is in its retaining position.

Figure 14A:
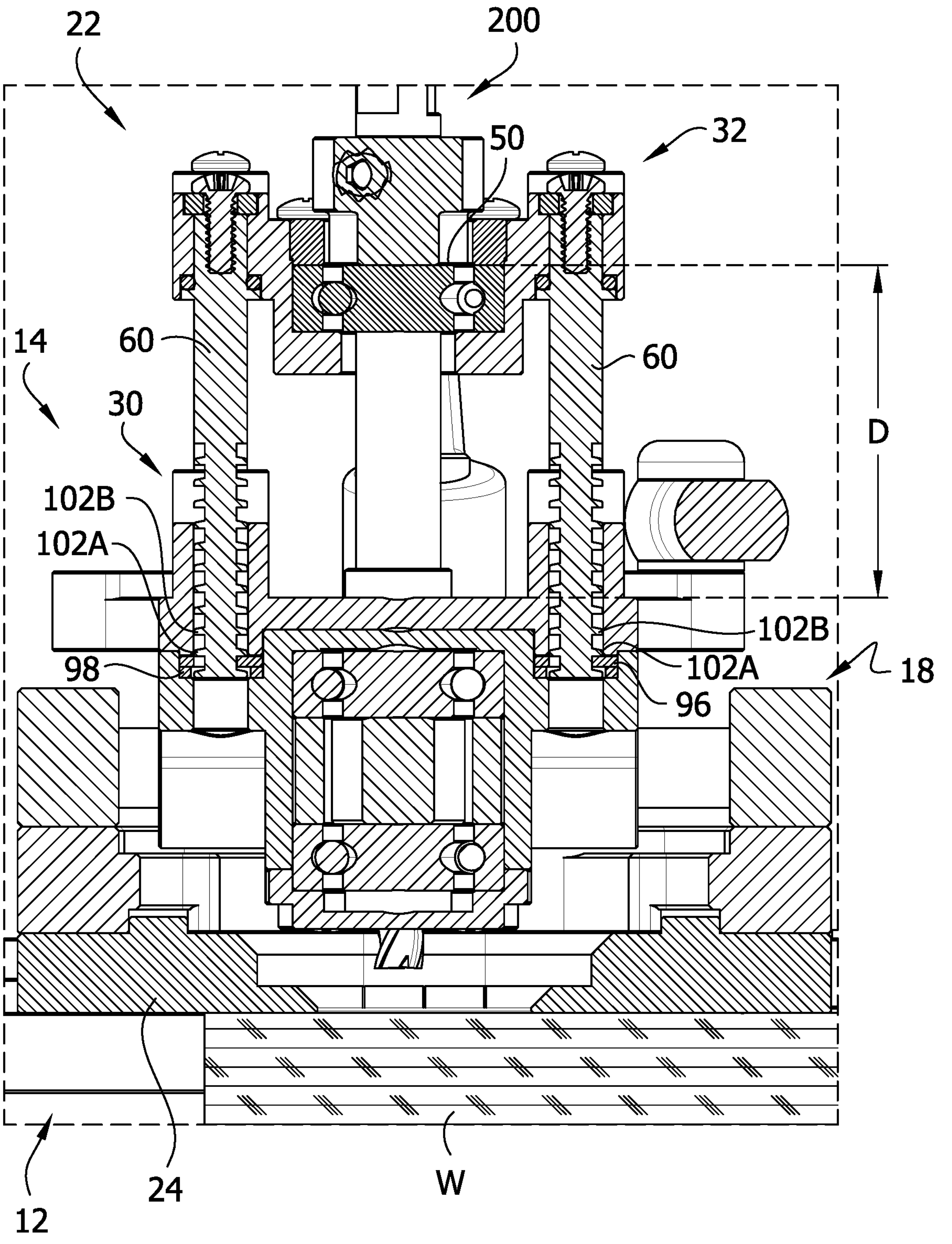
FIG. 14A-D illustrate the beginning of the cutting cycle.

Referring to FIGS. 14A-14D, the operation of the indexer 94 will now be described. The first and second indexing members 96, 98 (specifically, the stops 100 thereof) work together to control the movement of the drill bit support 32 toward the guide carriage 30. As will become apparent, the first and second indexing members 96, 98 are each arranged to alternate between the release and retaining positions. In particular, the first and second indexing members 96, 98 are arranged to alternate, with respect to each other, between the release and retaining positions such that, generally, the first indexing member is disposed in the release position when the second indexing member is disposed in the retaining position and the second indexing member is disposed in the release position when the first indexing member is disposed in the retaining position. This alteration enables the first and second indexing member 96, 98 (broadly, the indexer 94) to control the movement of the drill bit support 32 toward the guide carriage 30. In FIG. 14A, the jig 10 is ready to be used to cut the mortise M. The workpiece W has been positioned relative to the cutting window 16 of the jig 10. The drill bit 200 is connected to the drilling tool 1 (not shown in this figure). The drill bit 200 is disposed in the first and second drill bit openings 40, 48 and is engaged with and supported by the rest 50 of the drill bit support 32. The drill bit support 32 is at or near its initial position. As a result, the drill bit 200 (specifically, the cutting element 206 thereof) is spaced from the workpiece W. In this position, at least one of the indexing members 96, 98 (specifically, the stops 100 thereof) is in the retaining position. In FIG. 14A, the first indexing member 96 is in the retaining position. Accordingly, the stops 100 of the first indexing member 96 are engaged with one of the flanges 102 (hereafter referred to as a first flanges 102A), thereby inhibiting the drill bit support 32 from moving toward the guide carriage 30. In FIG. 14A, the guide 22 is shown near the middle of the rails 20, but it is understood the guide can be at any position along the rails when beginning to cut the mortise M.

Figure 14B:
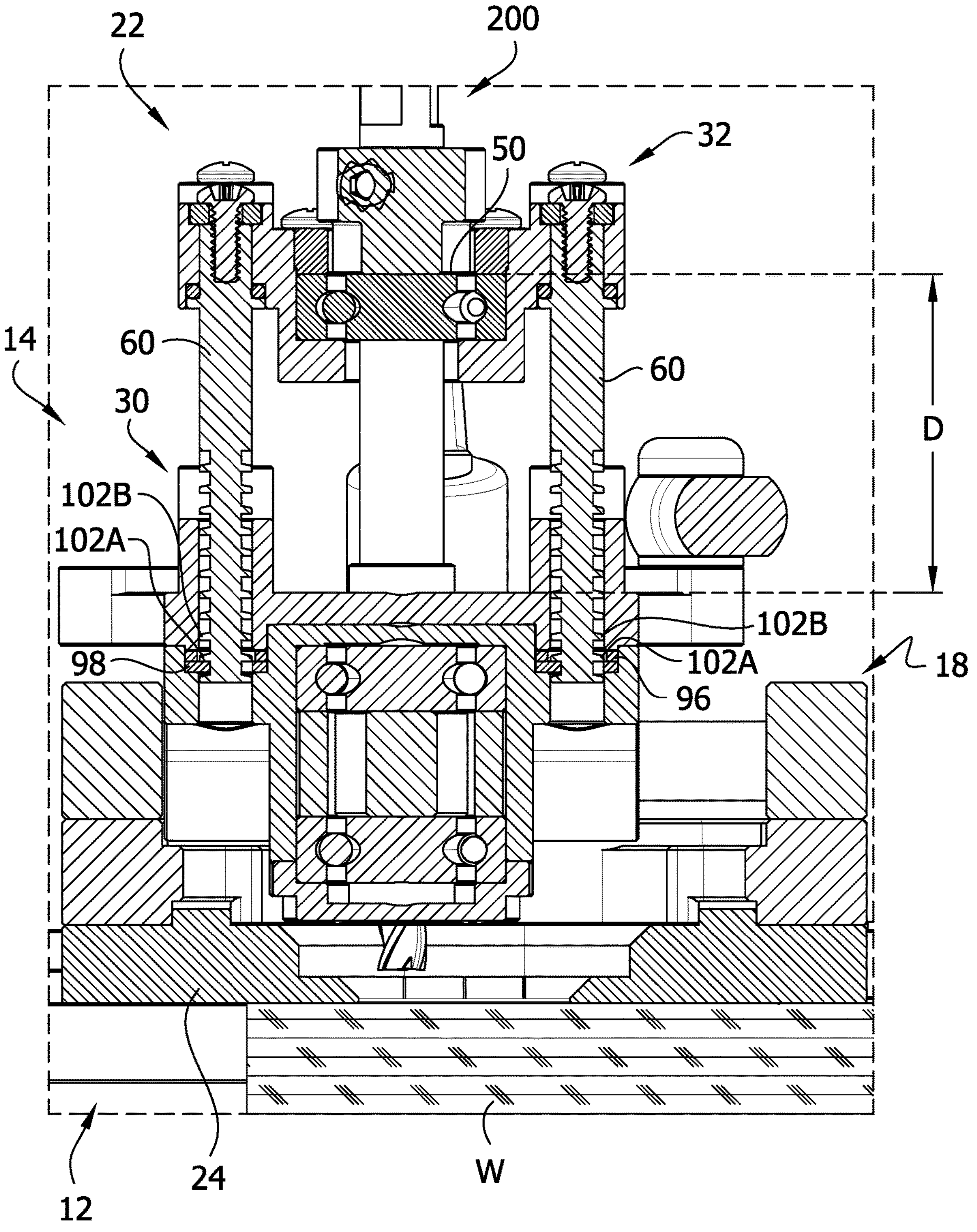

To begin cutting the mortise M, the operator activates the drilling tool 1 with one hand (such as by squeezing a trigger) to rotate the drill bit 200 and rocks the lever 84 with the other hand to move the guide 22 back and forth along the guide rails 20. FIG. 14B shows the position of the guide 22 after the operator has moved the guide to the left from the position shown in FIG. 14A. In this position, the guide 22 has completed a first stroke (leftward stroke). At the end of this first stroke, as the guide 22 neared the left rail support 28, the first engagement surface 115 was contacted by the left rail support and was moved (e.g., depressed) relative to the guide carriage 30 to rotate the first indexing member 96 from the retaining position to the release position (shown in FIG. 14B). When the first indexing member 96 reach the release position, the first flanges 102A move downward and engage the stops 100 of the second indexing member 98. The first flanges 102A (broadly, the drill bit support 32) move downward due to the weight of the drill bit 200 and drilling tool 1 in addition to any additional downward force imparted by the hand of the operator controlling the drilling tool. During movement of the first flanges 102A, the second indexing member 98 moved from the release position to the retaining position due to the indexing spring 128 and reaches its retaining position before being engaged by the first flanges 102A (so that the stops 100 can be engaged by the first flanges). As a result, the drill bit support 32 (broadly, the drill bit 200) has moved one step or discrete increment in the direction toward the workpiece W.

Figure 14C:
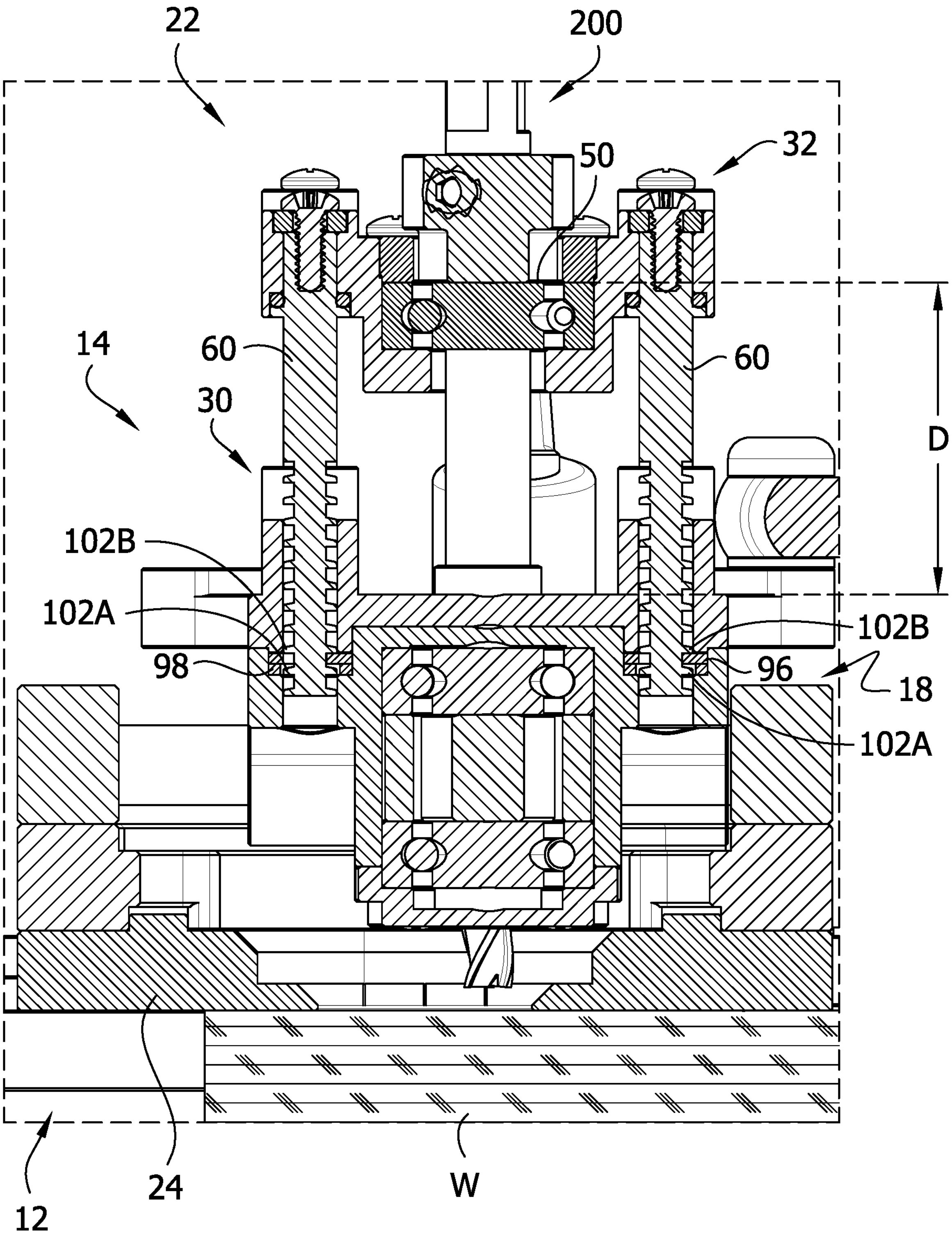
Figure 14D:
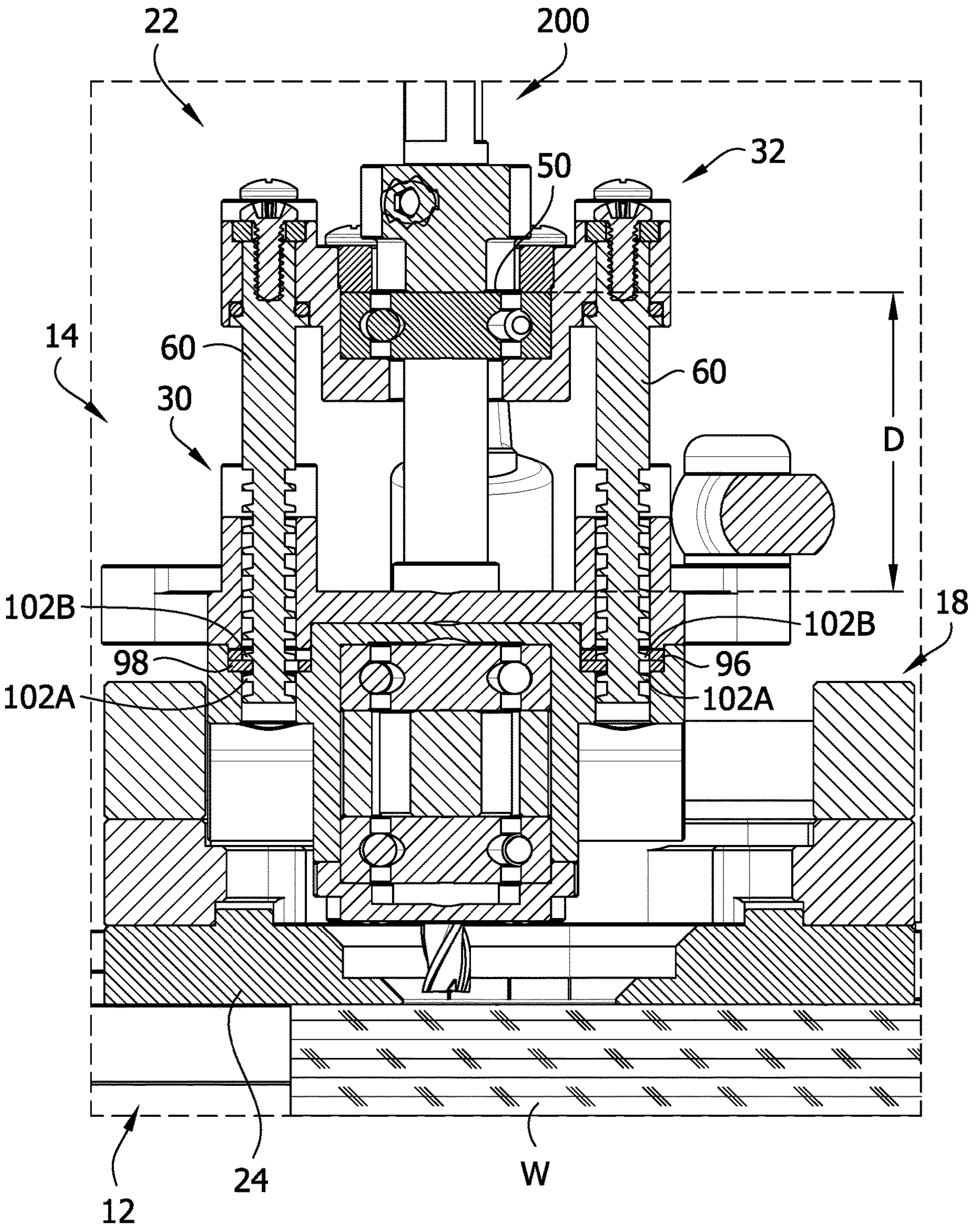

With the guide 22 in the position on the rails 20 shown in FIG. 14B, the operator pivots the lever 84 in the opposite direction and moves the guide to the right. FIG. 14C shows the position of the guide after the operator has moved the guide to the right from the position shown in FIG. 14B. In this position, the guide 22 has completed a second stroke (rightward stroke). During this second stroke, the second indexing member 98 remained in the retaining position, thereby maintaining a constant distance between the drill bit 200 and the workpiece W. At the end of the second stroke, as the guide neared the right rail support 28, the second engagement surface 117 was contacted by the left rail support and was moved (e.g., depressed) relative to the guide carriage 30 to move the second indexing member 98 from the retaining position to the release position (shown in FIG. 14C). When the second indexing member 98 reaches the release position, the first flanges 102A move downward and cleared the second indexing member 98. At the same time, the second flanges 102B (directly above the first flanges 102A) move downward and engage the stops 100 of the first indexing member 96. During movement of the second flanges 102B, the first indexing member 96 moves from the release position to the retaining position due to the indexing spring 128 and reaches its retaining position before being engaged by the second flanges 102B (so that the stops 100 can be engaged by the second flanges). As a result, the drill bit support 32 (broadly, the drill bit 200) has moved another step or discrete increment in the direction toward the workpiece W.

With reference to FIG. 14D, the operator has again pivoted the lever 84 to move the guide 22 to the left from the position shown in FIG. 14C. In this position, the guide 22 has completed a third stroke (another leftward stroke). At the end of this third stroke, as the guide 22 neared the left rail support 28, the first engagement surface 115 was contacted by the left rail support and was moved relative to the guide carriage 30 to move the first indexing member 96 from the retaining position to the release position (shown in FIG. 14D). It is appreciated the first engagement surface 115 returned to its proud position when the first indexing member 96 returned to its retaining position. When the first indexing member 96 reaches the release position, the second flanges 102B moves downward and engaged the stops 100 of the second indexing member 98. Like before, during movement of the second flanges 102B, the second indexing member 98 moved from the release position to the retaining position due to the indexing spring 128, and reaches its retaining position before being engaged by the second flanges 102B (so that the stops 100 can be engaged by the second flanges). As a result, the drill bit support 32 (broadly, the drill bit 200) has moved another step or discrete increment in the direction toward the workpiece W.

This process repeats each time the operator rocks the lever 84 (e.g., moves the guide 22 back and forth along the rails 20). The operator continues rocking the lever 84 until the drill bit 200 engages and begins cutting the mortise M in the workpiece. The operator continues rock the lever 84, to continue moving the drill bit 200 into the workpiece W, thereby cutting the mortise M deeper and deeper until the depth stop 64 engages the guide carriage 30. At this point, the desired depth of the mortise M has been reached and the mortise is cut.

In the illustrated embodiment, the distance between the bottom of one flange 102 and the bottom of the flange directly above the one flange is about 0.1 inches (about 2.5 mm). The thickness of each indexing member 96, 98 (broadly, the stops 100) is about 0.05 inches (about 1.3 mm). The drill bit support 32 moves toward the guide carriage 30 by stepping between the first and second indexing members 96, 98. As a result, because the indexing members 96, 98 are stacked one on top of the other, the thickness of the indexing members corresponds to the length of the discrete increments the drill bit support 32 moves toward the guide carriage 30. In the illustrated embodiment, the configuration of the indexer 94 results in the drill bit support 32 moving toward the guide carriage 30 in discrete increments of 0.05 inches (about 1.3 mm).

By controlling the gradual movement of the drill bit support 32 toward the guide carriage 30 with the indexer 94 (e.g., moving the drill bit support in the uniform discreet increments or steps), the drill bit 200 is able to easily move laterally (e.g., side-to-side) relative to the workpiece W when cutting the mortise M and form a cleaner mortise (e.g., even/planar surfaces defining the mortise) over conventional jigs where the depth of the drill bit is not controlled (e.g., the drill bit can cut to the full depth of the mortise before moving side-to-side). In such conventional jigs, the drill bit is subject to large stresses because of the large size of the cut the drill bit is creating, which causes the drill bit to deflect and cut on an angle when the drill bit is moved side-to-side. Mortise and tenon joints require precision matching between the corresponding mortise and tenon for a strong connection. Such irregular and uncontrollable deflections in the cutting done by the conventional jigs impedes such precision in the creation of the mortise, reducing the strength of the resulting connection.

Referring to FIGS. 5 and 9A-11, the indexer 94 includes a reset actuator 130. The reset actuator 130 is operatively coupled to the first and second indexing members 96, 98 (broadly, the stops 100 thereof) to simultaneously move the first and second indexing members 96, 98 to their respective release positions. By moving both the first and second indexing members 96, 98 to their respective release position, the drill bit support 32 can return to its initial position (due to the return spring 76). The operator may also have to raise the drilling tool 1 to permit the drill bit support 32 to return to its initial position. With the drill bit support 32 returned to its initial position, the jig 10 can be used to cut another mortise M. In the illustrated embodiment, the reset actuator 130 includes a button 132, a shaft 134, and a wedge 136. The shaft 134 extends between and interconnects the button 132 and the wedge 136. The shaft 134 is movably (e.g., slideably) disposed in an opening 138 of the guide block 30. The wedge 136 is arranged to engage and move (e.g., pivot) the first and second indexing members 96, 98 toward their respective release positions when the button 132 is pushed inward by the operator. As shown in FIG. 11, the first and second indexing members 96, 98 each includes a ramp or angled surface 140 the wedge 136 engages to pivot the indexing members. Other configurations of the reset actuator 130 are within the scope of the present disclosure.

Referring back to FIG. 4, in the illustrated embodiment, each of the rail supports 28 includes an adjustment mechanism 142 (e.g., a mortise length adjustment mechanism) for changing (e.g., fine tuning) the length of the mortise M. Each adjustment mechanism 142 includes a fastener 144 threadably coupled to the respective rail support 28. The respective heads of the fasteners 144 are arranged to be engaged by the first and second engagement surfaces 115, 117. Rotating the fasteners 144 changes the position of the heads, thereby changing (e.g., increasing or decreasing) the length of the cut mortise M (specifically, the length of each stroke). Each adjustment mechanism 142 also includes a set screw 146 used to releasably fix the position of each fastener 144. Other configurations of the adjustment mechanisms are within the scope of the present disclosure. For example, the jig may only include one adjustment mechanism.

Figure 3:
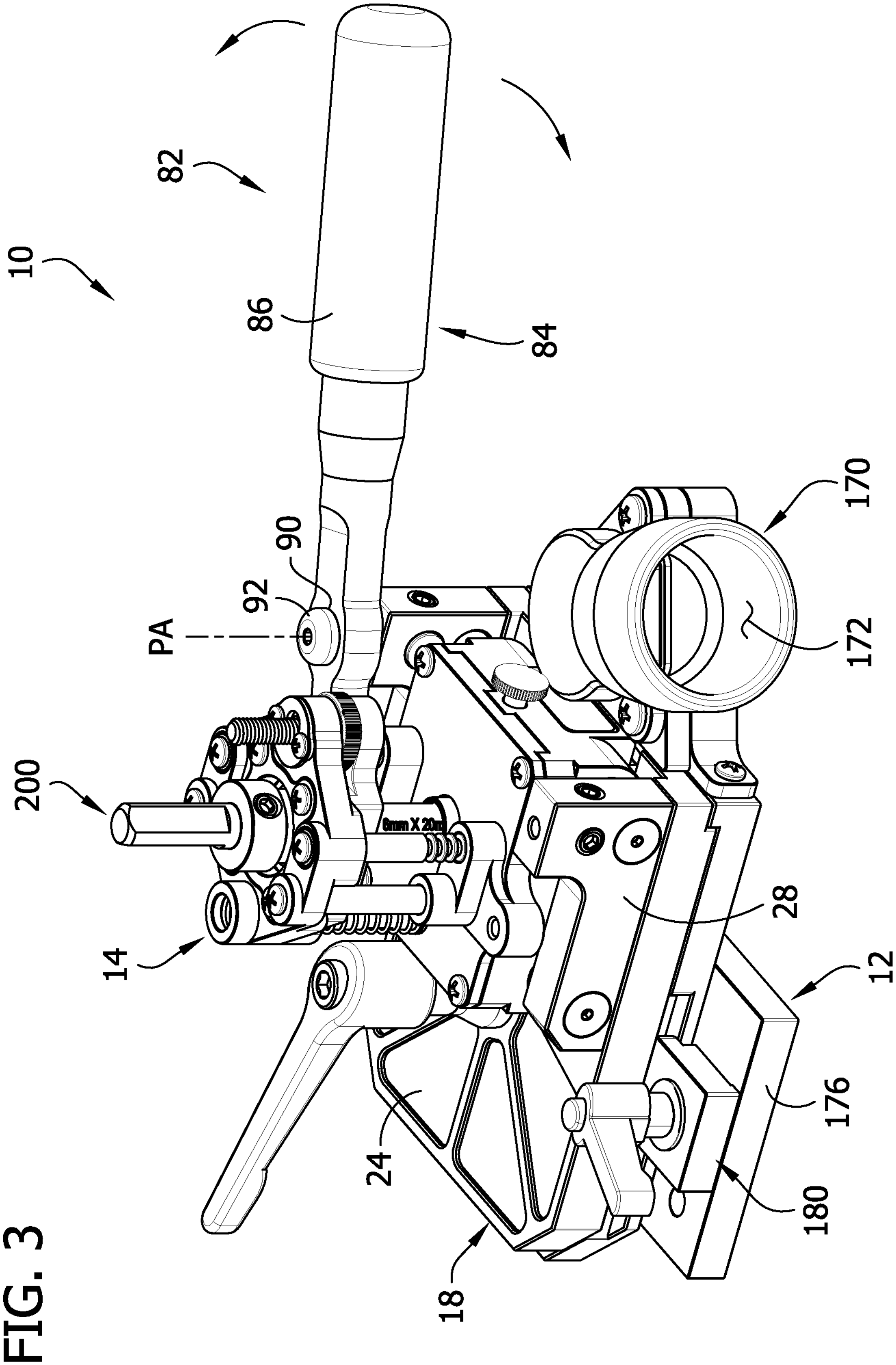
FIG. 3 is a right side perspective of the mortising jig, with a guide assembly thereof in a cutting position.
Figure 4:
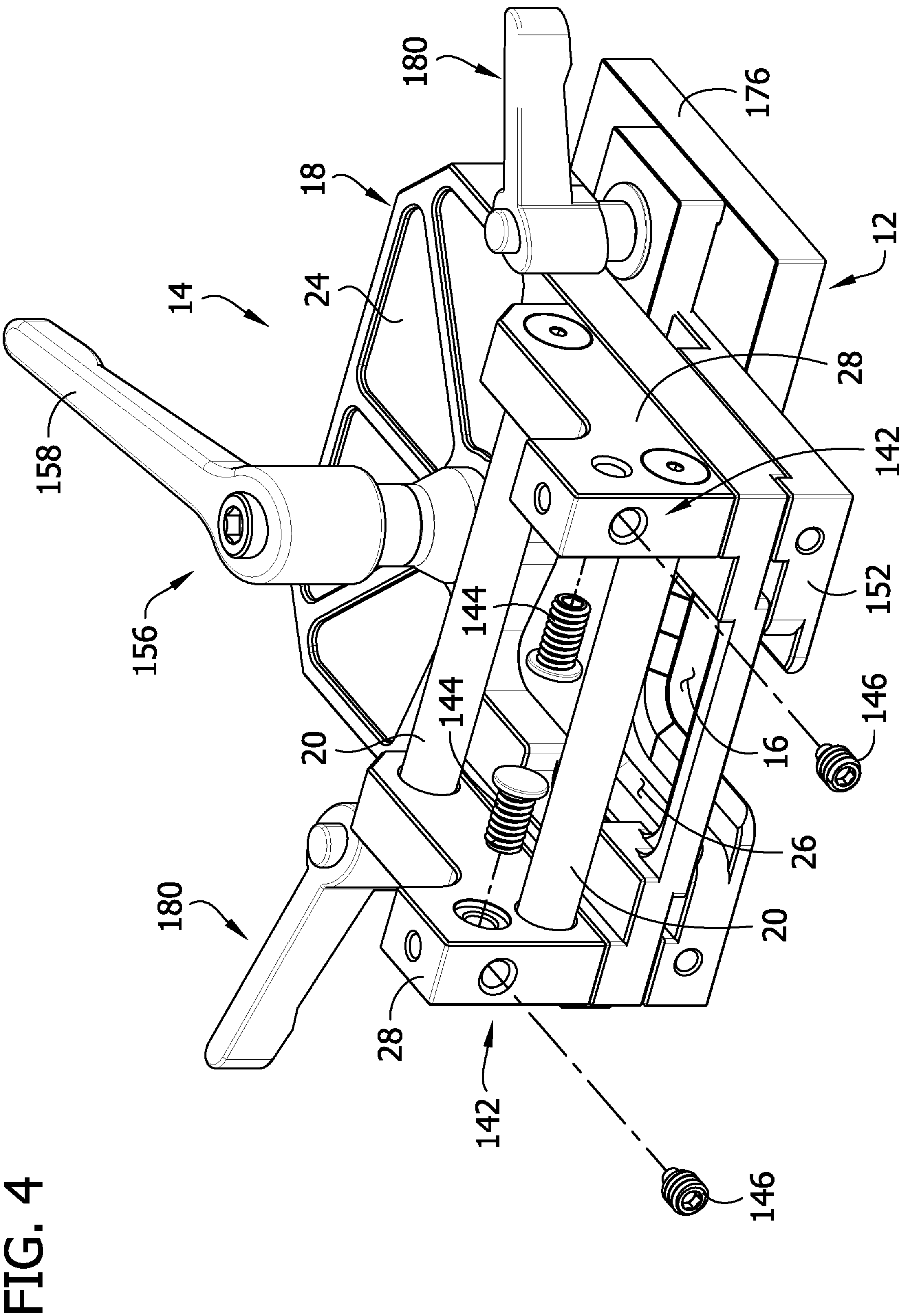
FIG. 4 is a rear perspective of the mortising jig, with a guide thereof removed.
Figure 18:
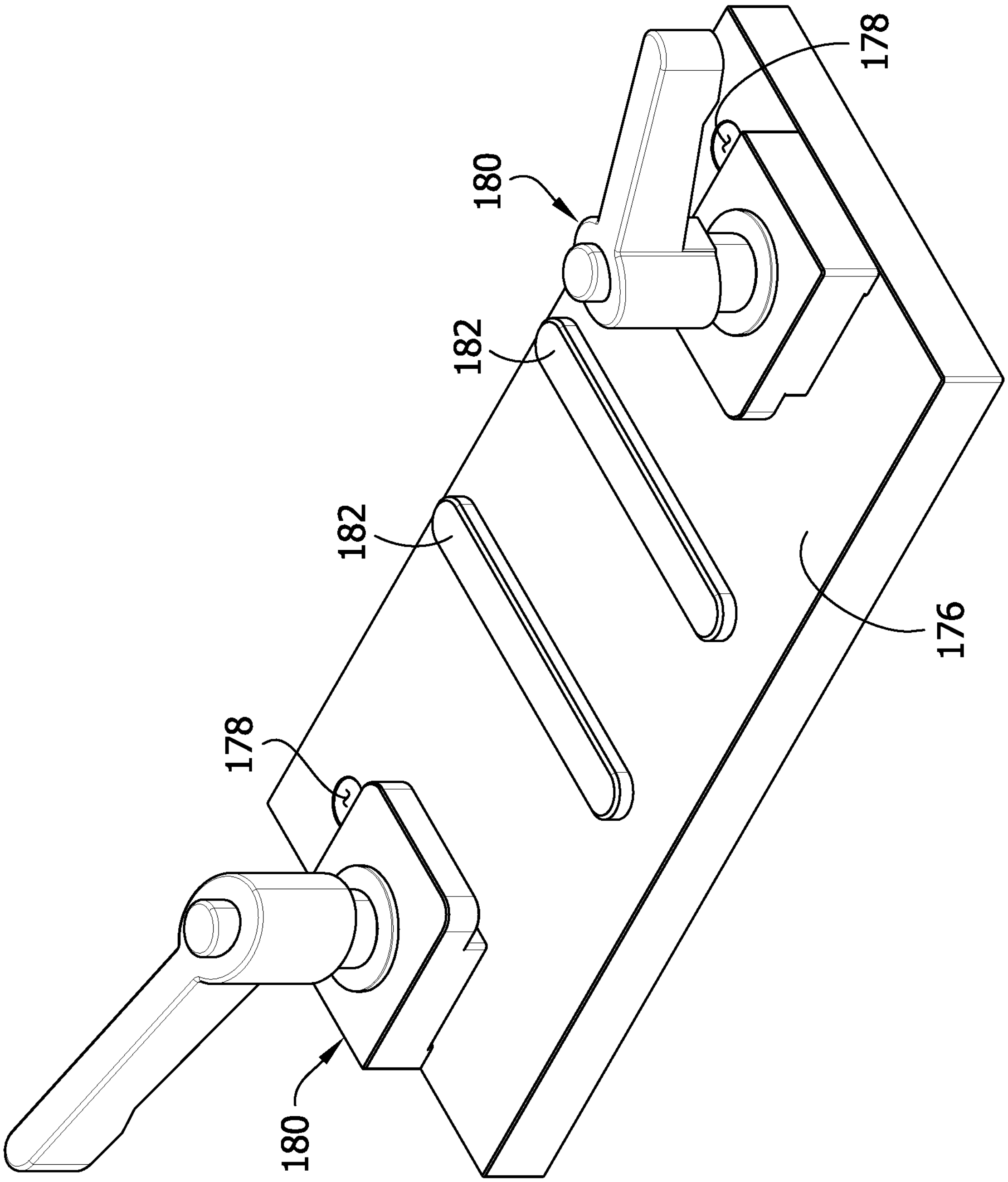
FIG. 18 is a perspective of a mounting plate.
Figure 19:
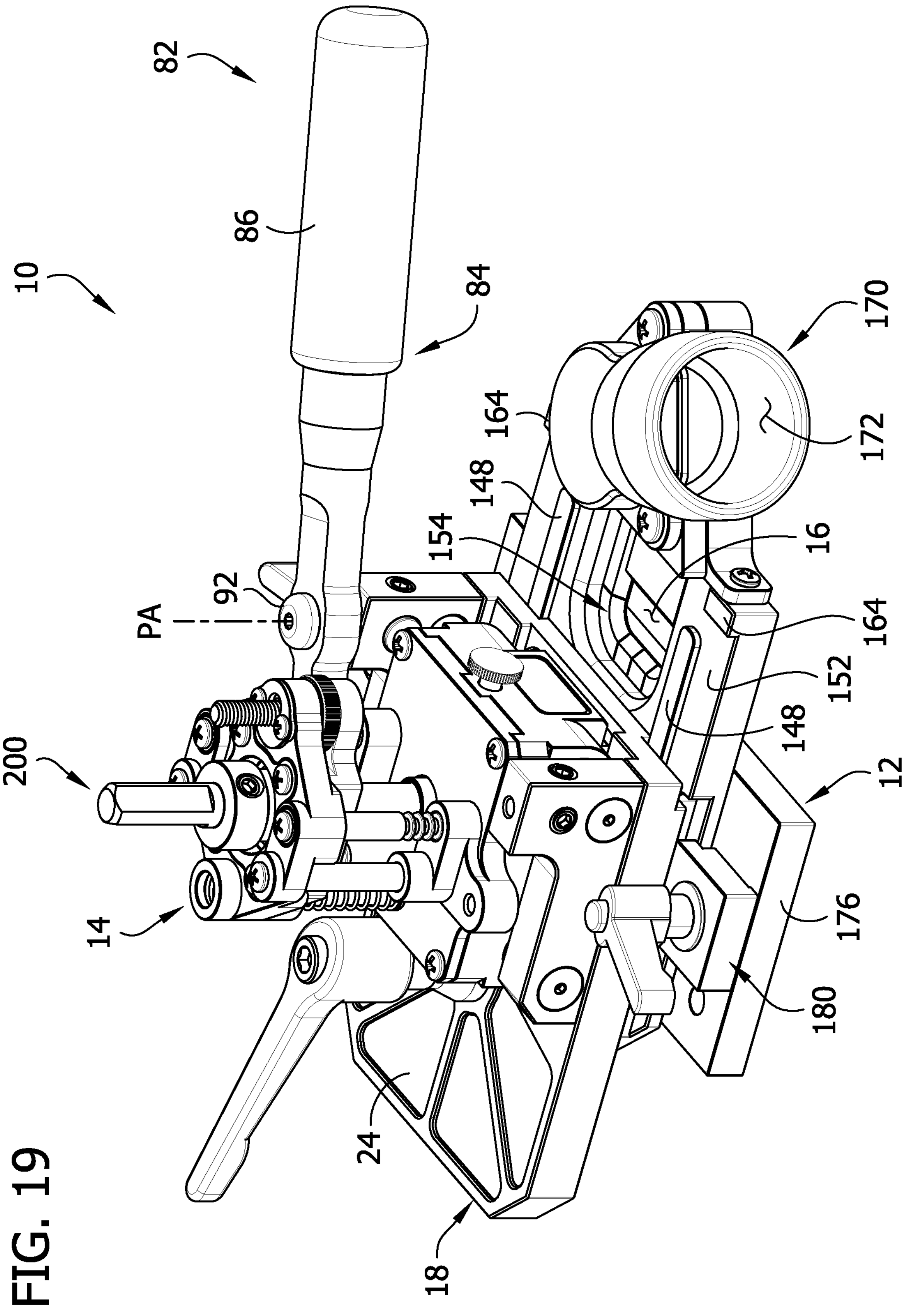
FIG. 19 is a perspective of the mortising jig, with a guide assembly thereof in a setup position.
Figure 20:
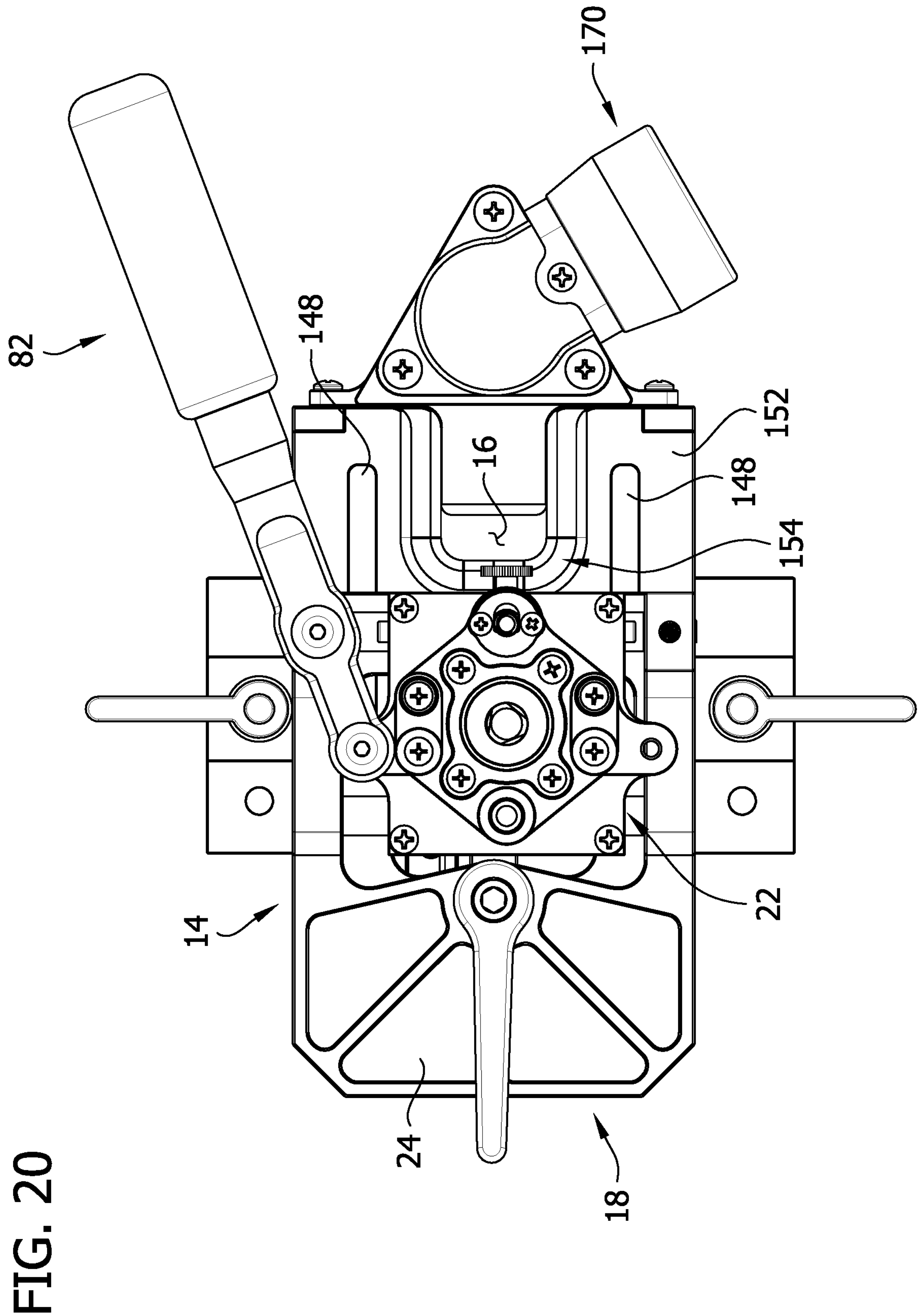
FIG. 20 is a top view of the mortising jig, with a guide assembly thereof in the setup position.

Referring to FIGS. 4 and 15-21B, as mentioned above, the guide assembly 14 is supported by and movably attached to the base 12. The guide assembly 14 is movable relative to the base 12 between a cutting position (shown in FIGS. 3, 4 and 21A) and a setup position (shown in FIGS. 19, 20, and 21B). In the cutting position, the drill bit 200 received by the guide 22 is aligned with the cutting window 16 of the base 12. In particular, the longitudinal axis LA of the first drill bit opening 40 (and the second drill bit opening 48) is aligned with (e.g., intersects) the cutting window 16 of the base 12 and the workpiece W. This allows the drill bit 200 to extend through the cutting window 16 to engage the workpiece W to cut the mortise M, as described above. In the setup position, generally, the guide assembly 14 is spaced apart or offset from the cutting window 16. Specifically, the longitudinal axis LA of the first drill bit opening 40 (and the second drill bit opening 48) is spaced apart from the cutting window 16 of the base 12. Being able to move the guide assembly 14 between the cutting and setup positions, makes it easier for an operator to set up the jig 10 to cut the mortise M in the workpiece W. As illustrated in FIG. 3, when the guide assembly 14 is in the cutting position, the guide assembly overlies and generally inhibits or blocks the operator from viewing the cutting window 16. This can make it difficult to properly align the workpiece W with the drill bit 200 to cut the mortise M in the correct location. As illustrated in FIGS. 19 and 20, when the guide assembly 14 is in the setup position, the guide assembly does not block the cutting window 16 and permits the operator to view the cutting window. Using the cutting window 16 to view the portion of the workpiece W that will be cut allows the operator to more easily align the workpiece W with the drill bit 200. To assist in the alignment between the workpiece W and the jig 10, the jig includes indicia 154 (e.g., mortise alignment indicia) arranged to visually indicate the general location of where the mortise M will be cut. In the illustrated embodiment, the base 12 includes the indicia 154 and the indicia is arranged relative to the cutting window 16 to visually indicate the general location of where the mortise M will be cut on the workpiece W. In the illustrated embodiment, the indicia 154 includes a centering indicia 154A arranged to visually indicate a center of the mortise M. The centering indicia 154A comprises three lines (broadly, two or more lines) arranged to visually designed the center of the cutting window 16 and thereby the center of the mortise M that will be cut. The indicia 154 also includes an end indicia 154B arranged to visually indicate the first and second ends of the mortise M (broadly, approximate the location of the first and second ends of the mortise M that will be cut based on the position of the adjustment mechanisms 142). The end indicia 154B comprises two lines arranged to visually designate the ends of the mortise M that will be cut. The two lines are arranged such as to generally designate the center of the cutting element 206 of the drill bit 200 when the guide is at the end of a stroke. The indicia 154 are preferably visually distinctive relative to the rest of the base, such as a different color (e.g., white, red, yellow, etc.). Other suitable forms of the indicia are within the scope of the present disclosure.

The jig 10 includes a retainer 156 for releasably securing the guide assembly 14 in the cutting position. The retainer 156 may also be used to releaseably secure the guide assembly 14 in the release position if desired. In the illustrated embodiment, the retainer 156 includes a knob or handle 158 threadably coupled to a clamp nut 160. The handle 158 is disposed above the guide plate 24. The clamp nut 160 is disposed in a slot 162 on the underside of a base plate 152 of the base 12. Rotating the handle 158 in one direction tightens the clamp nut 160 against the base plate 152 to secure the guide assembly 14 in the cutting or release position (broadly, fixed relative to the base 12). Rotating the handle 158 in the opposite direction loosens the clamp nut 160 from the base plate 152 to permit the guide assembly to move between the cutting and release positions (broadly, relative to the base 12).

The jig 10 includes cutting position stops 164 (broadly, at least one stop) arranged to position the guide assembly 14 in the cutting position. In the illustrated embodiment, the cutting position stops 164 comprise walls extending upward from the base plate 162 and are arranged to engage and stop the movement of the guide assembly 14 (specifically, guide plate 24) when the guide assembly is moving from the release position to the cutting position. When the guide assembly 14 engages the cutting position stops 164, the guide assembly 14 is in the cutting position. The jig 10 also includes a release position stop 166 arranged to position he guide assembly 14 in the release position. In the illustrated embodiment, the release position stop 166 comprises a reliantly deflectable arm mounted on the base plate 152 and arranged to engage a shaft 168 of the retainer 156 operatively connecting the clamp nut 160 to the handle 158. When the guide assembly 14 engages the release position stop 166, the guide assembly 14 is in the cutting position. The shaft 168 can be moved past the release position stop 166 by sufficiently deflecting the arm to permit the guide assembly 14 to be disconnected from the base 12. Other configurations of these stops are within the scope of the present disclosure.

In the illustrated embodiment, the guide assembly 14 and the base 12 include corresponding rails 148 and slots 150 that guide linear movement of the guide assembly 14 relative to the base 12 between the cutting and release positions. In the illustrated embodiment, the underside of the guide plate 24 includes the slots 150 and an upper side of the base plate 152 includes the rails 148, although it is understood the guide plate could include the rails and the base plate could include the slots, or some combination thereof. The guide plate 24 rests and slides on the base plate 152, with the rails 148 being disposed in the slots 150 to guide the linear movement. The base plate 152 also defines the cutting window 16.

The jig 10 may include a vacuum port 170 for connecting the jig to a vacuum or debris (e.g., dust) collection system (not shown) to remove debris (e.g., shavings) from the jig. In the illustrated embodiment, the vacuum port 170 is attached to the base plate 152. The vacuum port 170 defines an outlet 172 (FIG. 3) that is fluidly coupled to the collection system when the collection system is attached to the vacuum port. The jig 10 defines a vacuum passage 174 (FIG. 21A) extending between and fluidly coupling the outlet 172 to the cutting window 16. The path indicated by arrow A (FIG. 21A) generally shows the flow of the debris from the cutting window 16 to the outlet 172. The debris is generated as the drill bit 200 forms the mortise M. The vacuum passage 174 is generally defined by the vacuum port 170, the base plate 152 and the guide plate 24. Other configurations of the vacuum port are within the scope of the present disclosure.

The base 12 includes a mounting plate 176. The base plate 152 is supported by and movably (e.g., slideably) attached to the mounting plate 176. The mounting plate 176 is configured to be secured to the mortising support 2. For example, the mounting plate 176 includes two openings 178 for receiving fasteners (e.g., bolts, screws) for securing the mounting plate 176 to the mortising support (FIG. 18). Accordingly, the mounting plate 176 is generally fixed relative to the front face 4 of the fence 3. The base plate 152 is movable relative to the mounting plate 176 to allow the operator to position the cutting window 16 (and thereby the drill bit 200) relative to the front face 4 of the fence 3 (e.g., a transverse direction relative to the length of the fence). This allows the jig 10 to be arranged for different sizes of workpieces, such as to accommodate workpieces W of different thicknesses. The base 12 includes two retainers or clamps 180 for releasably securing the base plate 152 to the mounting plate 176. Tightening the clamps 180 against the base plate 152 secures (e.g., fixes) the position of the base plate 152 relative to the mounting plate 176. Loosening the clamps 180 from the base plate 152 permits the base plate to move relative to the mounting plate 176. In the illustrated embodiment, the base plate 152 and the mounting plate 176 include corresponding rails 182 and slots 184 that guide linear movement of the base plate relative to the mounting plate. In the illustrated embodiment, the underside of the base plate 152 includes the slots 184 (FIG. 17) and an upper side of the mounting plate 176 includes the rails 182 (FIG. 18), although it is understood the base plate could include the rails and the mounting plate could include the slots, or some combination thereof. The base plate 152 rests and slides on the mounting plate 176, with the rails 182 being disposed in the slots 184 to guide the linear movement.

Figure 22:
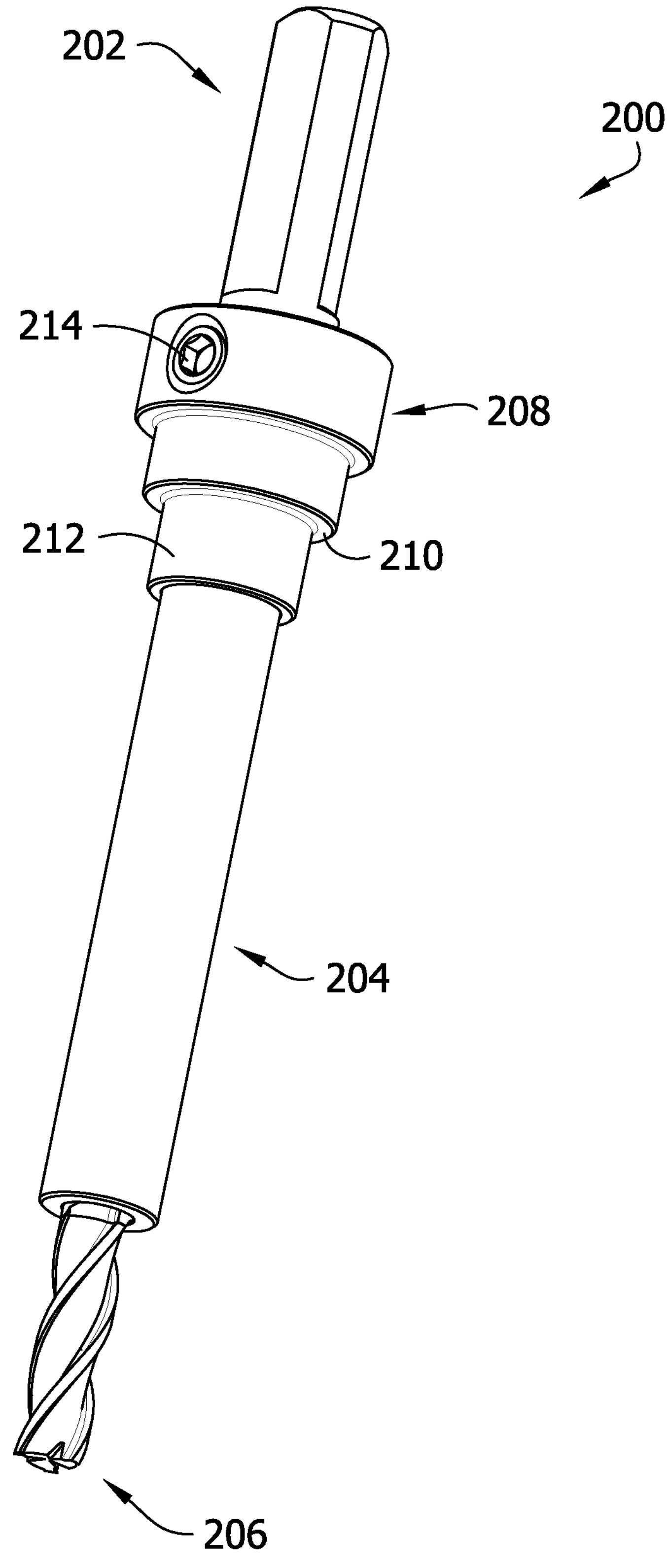
FIG. 22 is an enlarged perspective of the drill bit.

Referring to FIG. 22, the drill bit 200 of the present disclosure is shown in more detail. The drill bit 200 includes a shank 202, a cylindrical shaft 204 and a cutting element 206. The shank 202 extends from one end of the shaft 204 and the cutting element 206 extends from the other end of the shaft. The shank 202 has chamfered sides for engaging a chuck of the drilling tool 1, as generally known in the art for connecting the drill bit to the drilling tool. The cutting element 206 is configured to cut the workpiece W to form the mortise M. In the illustrated embodiment, the cutting element 206 comprises a milling cutting element having three flutes for milling the workpiece W to form the mortise M. The milling cutting element is preferred because of how the jig 10 moves the drill bit 200 during each stroke to cut the length of the mortise M, although other cutting elements are within the scope of the present disclosure. The drill bit 200 includes a stop collar 208. The stop collar 208 is mounted on the shaft 204. The stop collar 208 is the portion of the drill bit 200 that engages the rest 50 of the drill bit support 32. The stop collar 208 includes a circumferential lip or shoulder 210 that engages the rest 50. In the illustrated embodiment, the stop collar 208 also includes a plug or cylindrical wall 212 extending from the shoulder 210. The plug 212 is sized and shaped to be inserted into the second drill bit opening 48. The stop collar 208 is movable (e.g., slideable) along the shaft 204. This allows the distance between the stop collar 208 and the cutting element 206 to be adjusted. Preferably, the stop collar 208 is positioned relative to the cutting element 206 so that when the drill bit 200 is supported by the drill bit support 32 in the initial position, the cutting element is spaced from the workpiece W (e.g., spaced above the cutting window 16). In the illustrated embodiment, the stop collar 208 includes a set screw 214 that engages the shaft 204 to secure the stop collar in position along the shaft. In other embodiments, the stop collar may be non-adjustably fixed to the shaft. For example, the stop collar may be an integral, one-piece component with the shaft instead of separate pieces.

Figure 23:
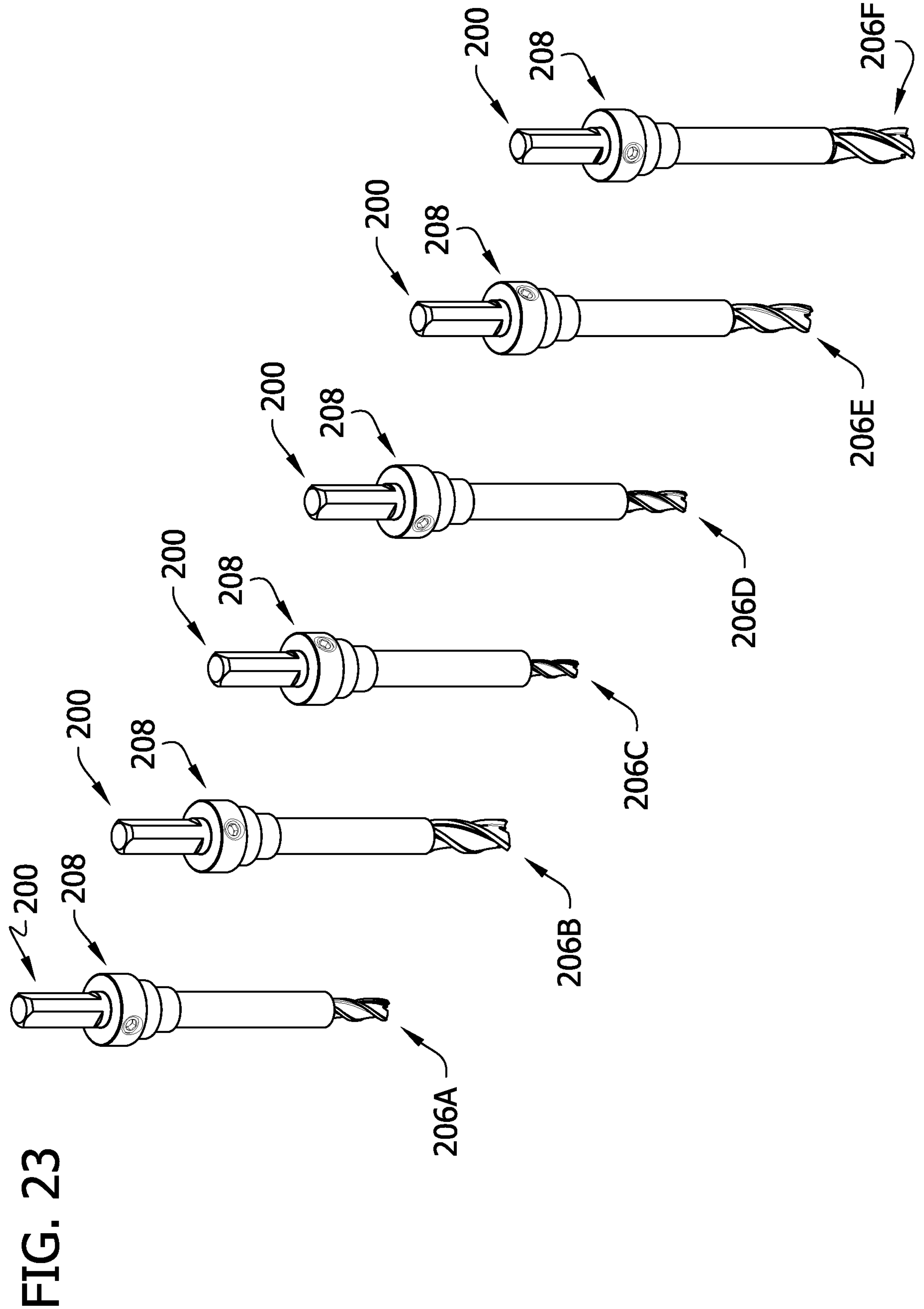
FIG. 23 is a perspective of a set of drill bits.

Referring to FIG. 23, in one embodiment, the jig 10 includes a set of drill bits 200. The drill bits 200 are all generally the same except for the diameters of the cutting elements 206 (e.g., cutting elements 206A-F). Each drill bit 200 of the set has a different diameter cutting element 206A-F (e.g., 5 mm, 6 mm, 8 mm, 10 mm, ¼ inch, ⅜ inch, etc.). Other diameters (e.g., standard drill bit diameter or sizes) are within the scope of the present disclosure. The diameter of the cutting element 206A-F corresponds to the thickness of the mortise M cut. In operation, the operator selects the drill bit 200 with the cutting element 206A-F having the desired diameter. In this manner, the jig 10 can cut different thicknesses of mortises M for different thicknesses of tenons. Besides the diameter of the cutting elements 206A-F, each drill bit 200 in the set is substantially identical. In particular, the diameters of the shafts 204 and plug 212 of the stop collar 208 are all identical. Accordingly, the drill bits 200 are all interchangeable with the jig 10. This allows the operator to simply select and connect the drill bit 200 with the desired cutting diameter to the drilling tool 1 and insert the drill bit into the guide 22 of the jig 10.

Operation of the jig 10 is as follows. First, the workpiece W is located relative to the jig 10. The operator secures the workpiece W to the fence 3 with the clamp 6. If needed, the operator adjusts the position of the cutting window 16 relative to the front face 4 of the fence 3 by moving the base plate 152. When moving the base plate 152, the guide assembly 14 is moved to the setup position to allow the operator an unobstructed view of the cutting window 16 and its position relative to the surface of the workpiece W the mortise M will be cut in. After the cutting window 16 is positioned, the operator moves the guide assembly 14 to the cutting position. The operator selects the desired diameter of drill bit 200 and couples the selected drill bit to the drilling tool 1. The operator then inserts the drill bit 200 attached to the drilling tool 1 into the guide 22. If needed, the operator adjusts the depth stop 64 to the desired cutting depth of the mortise M. The jig 10 is now ready to cut the mortise M.

The mortise M is cut by operating the drilling tool 1 to rotate the drill bit 200 while at the same time grasping the handle 86 and rocking the lever 84 back and forth. This causes the guide 22 to slide along the guide rails 20 in a reciprocating motion, thereby moving the drill bit 200 in the reciprocating motion. As the lever 84 pivots back and forth, the drill bit 200 moves incrementally toward the workpiece W and engages the workpiece. Once the drill bit 200 engages the workpiece W, the drill bit begins cutting the mortise M. The continued rocking of the lever 84 back and forth continues to move the drill bit 200 to cut the mortise M, with the drill bit moving incrementally deeper into the workpiece W, as described above, during the rocking. While the mortise M is being cut, the collection system attached to the vacuum port 170 is removing (e.g., sucking) the debris generated by the cutting from the jig 10. The operator continues to rock the lever 84 until the depth stop 64 prevents the drill bit from moving any deeper into the workpiece. The mortise M is now cut and the operator can remove the drill bit 200 from the guide 22, remove the workpiece W from the fence 3, and reset the drill bit support 32 to its initial position to ready the jig 10 to cut another mortise.

Figure 24:
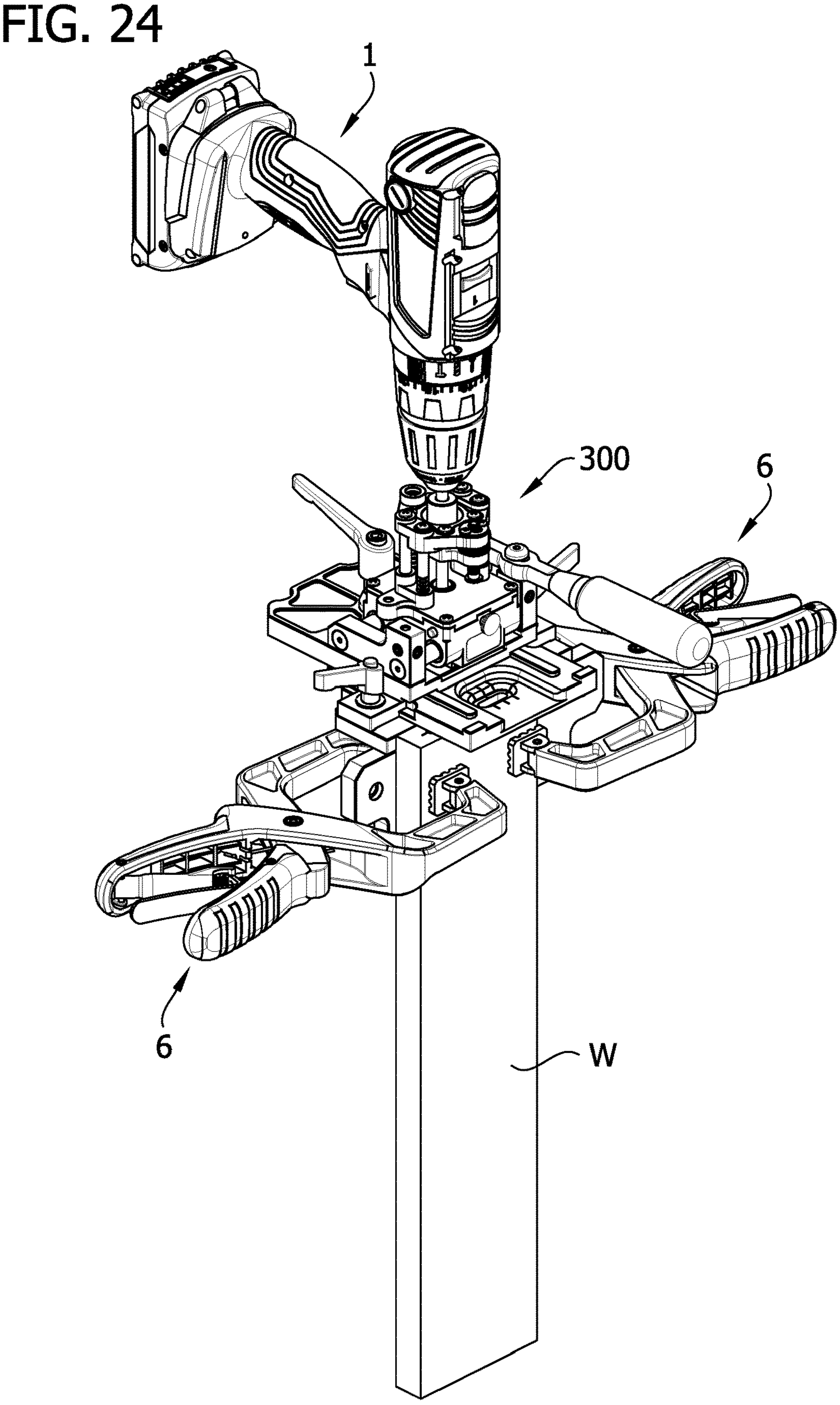
FIG. 24 is a perspective of a mortising assembly according to another embodiment of the present disclosure operating on the workpiece.
Figure 25:
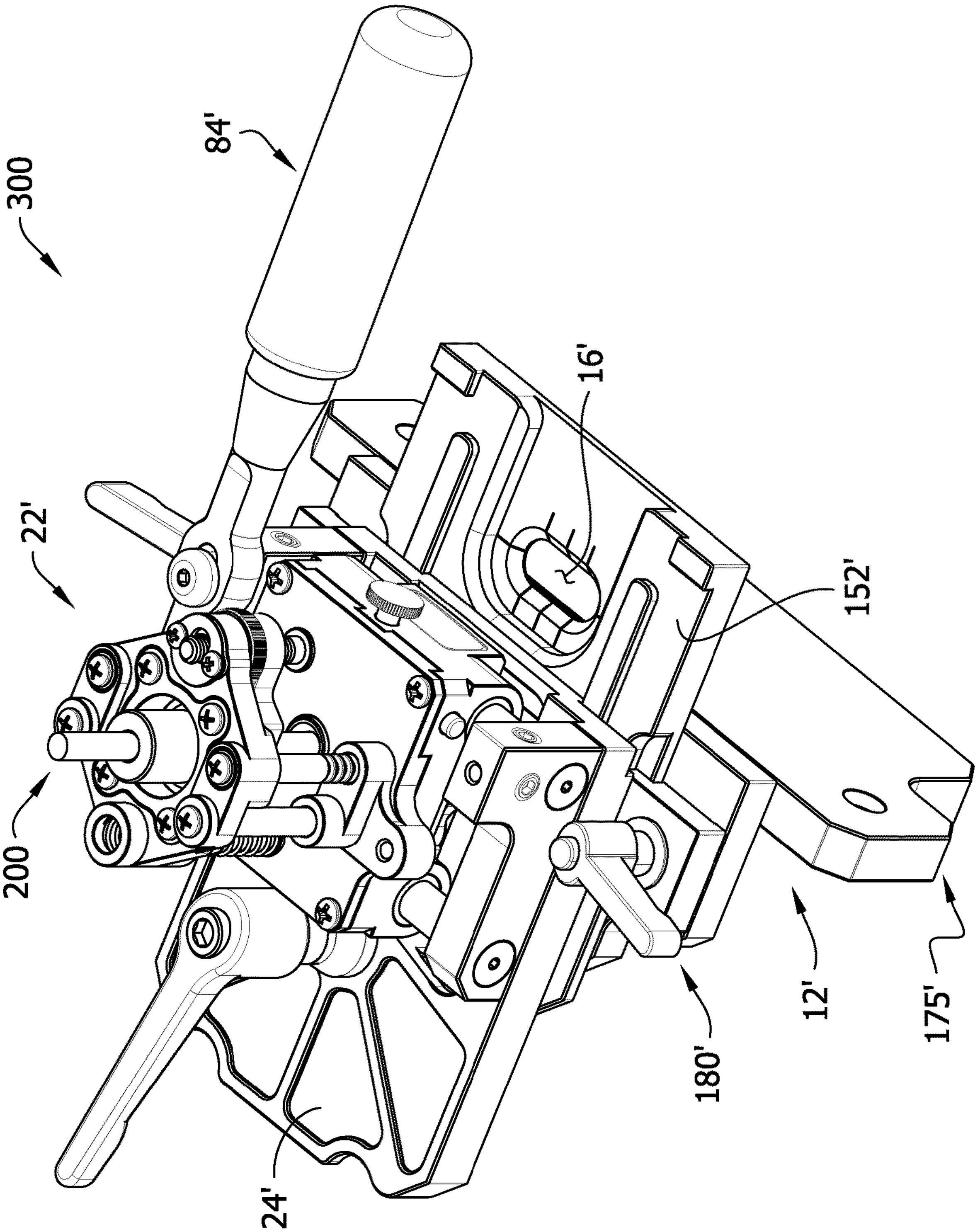
FIG. 25 is a perspective of a mortising jig of the mortising assembly of FIG. 24.
Figure 26:
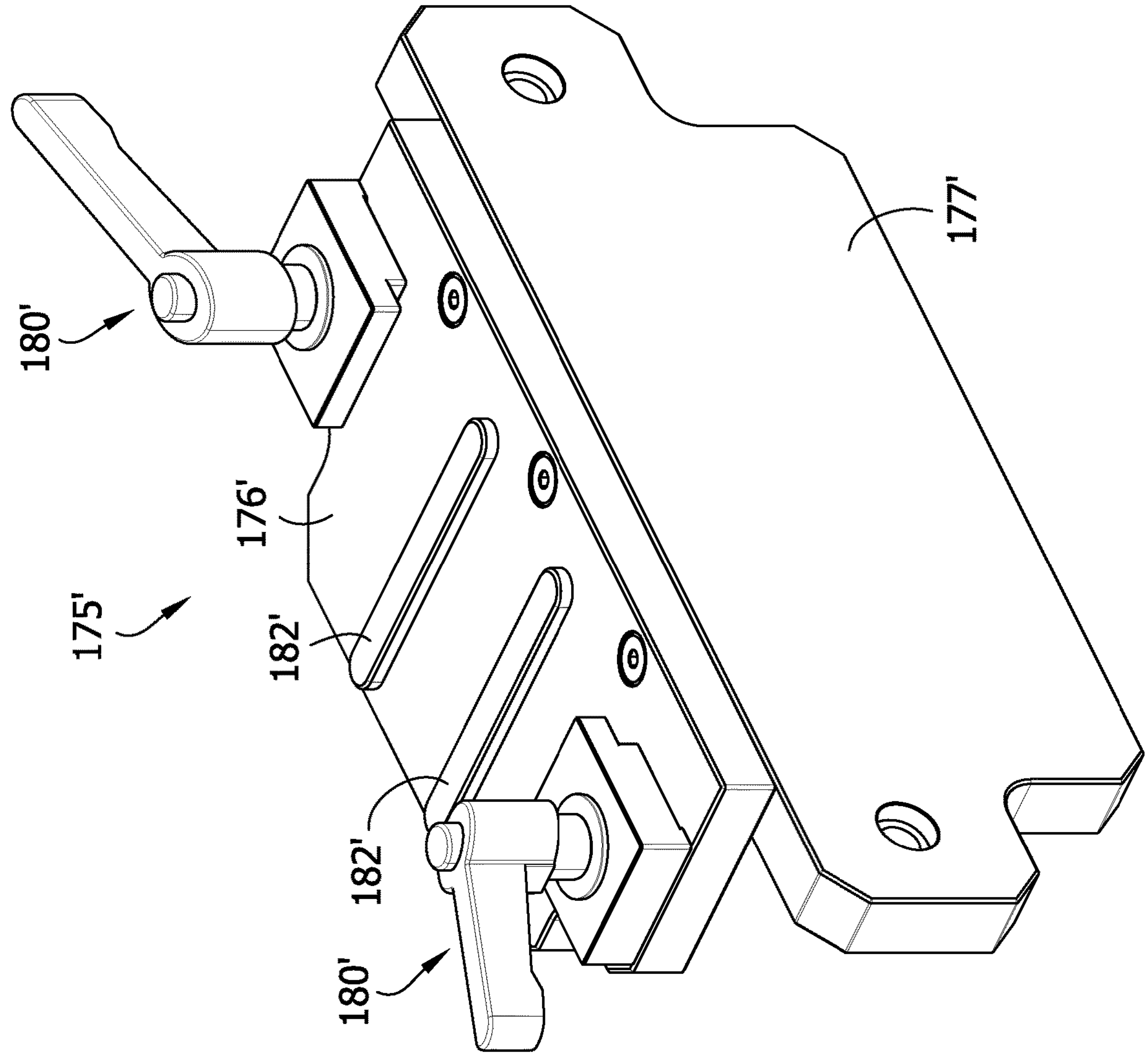
FIG. 26 is a perspective of a mounting bracket of the mortising jig of FIG. 25.

Referring to FIGS. 24-26, another embodiment of a mortising jig according to the present disclosure is generally indicated by reference numeral 300. The jig 300 of FIGS. 24-26 is generally analogous to the jig 10 of FIGS. 1-23 and, thus, for ease of description, where similar, analogous or identical parts are used, identical reference numerals with the addition of a trailing prime (') are used. Accordingly, unless clearly stated or indicated otherwise, the above descriptions regarding the jig 10 of FIGS. 1-23 also apply to the jig 300 of FIGS. 24-26.

In this embodiment, the base 12' includes a mounting bracket 175'. In this embodiment, the mounting bracket 175' can be used to secure the workpiece W directly to the base 12' via one or more clamps 6. Alternatively, the mounting bracket 175' can still be attached to a mortising support 2. In this embodiment, the mounting bracket 175' includes a top plate 176', similar to the mounting plate 176 described above, and a vertical plate 177' attached to and extending downward from the top plate. The vertical plate 177' has a front face which the workpiece W can engage and be fixed to via the one or more clamps 6. Thus, in this embodiment, movement of the base plate 152' moves the cutting window 16' relative to the front face of the vertical plate 177'. In addition, in this embodiment the illustrated jig 300 does not include a vacuum port, although the jig 300 could include a vacuum port.

Having described the present disclosure in detail, it will be apparent that modifications and variations are possible without departing from the scope of the present disclosure defined in the appended claims.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the present disclosure are achieved and other advantageous results attained.

As various changes could be made in the above constructions and methods without departing from the scope of the present disclosure, it is intended that all matter contained in the above description and shown in the accompanying drawings shall be interpreted as illustrative and not in a limiting sense.

What is claimed is:

1. A jig for cutting a mortise in a workpiece using a drilling tool having a drill bit, the jig comprising:

a guide assembly configured to locate and move the drill bit of the drilling tool relative to the workpiece, the guide assembly comprising:

a guide rail; and a guide comprising:

a guide carriage movably mounted on the guide rail for movement along the guide rail;

a drill bit support arranged to be movable with the guide carriage, the drill bit support including a rest arranged to locate the drill bit of the drilling tool relative to the workpiece, the drill bit support being movable relative to the guide carriage to change a distance between the rest and the guide carriage, the movement of the drill bit support relative to the guide carriage to change the distance between the rest and the guide carriage being actuated by movement of the guide carriage on the guide rail;

an indexer arranged to control the movement of the drill bit support relative to the guide carriage;

wherein the guide carriage is supported by the guide rail for linear reciprocating motion with respect to the guide rail, the linear reciprocating motion including a series of strokes in alternating directions, wherein the indexer is configured to permit the movement of the drill bit support relative to the guide carriage when the guide carriage is generally at the end of each stroke and is configured to inhibit the movement of the drill bit support relative to the guide carriage during each stroke prior to the guide carriage being generally at the end of each stroke, and wherein the guide assembly comprises a pivotable lever operatively connected to the guide carriage such that rocking motion of the lever produces the linear reciprocating motion of the guide carriage on the guide rail.

2. The jig of claim 1, wherein the indexer is configured to control the movement of the drill bit support relative to the guide carriage to change the distance between the rest and guide carriage by discrete increments.

3. The jig of claim 2, wherein the indexer is configured to control the movement of the drill bit support toward the guide carriage to decrease the distance between the rest and guide carriage by the discrete increments.

4. A jig for cutting a mortise in a workpiece using a drilling tool having a drill bit, the jig comprising:

a guide assembly configured to locate and move the drill bit of the drilling tool relative to the workpiece, the guide assembly comprising:

a guide rail; and a guide comprising:

a guide carriage movably mounted on the guide rail for movement along the guide rail;

a drill bit support arranged to be movable with the guide carriage, the drill bit support including a rest arranged to locate the drill bit of the drilling tool relative to the workpiece, the drill bit support being movable relative to the guide carriage to change a distance between the rest and the guide carriage, the movement of the drill bit support relative to the guide carriage to change the distance between the rest and the guide carriage being actuated by movement of the guide carriage on the guide rail;

an indexer arranged to control the movement of the drill bit support relative to the guide carriage;

wherein the guide carriage is supported by the guide rail for linear reciprocating motion with respect to the guide rail, the linear reciprocating motion including a series of strokes in alternating directions, wherein the indexer is configured to permit the movement of the drill bit support relative to the guide carriage when the guide carriage is generally at the end of each stroke and is configured to inhibit the movement of the drill bit support relative to the guide carriage during each stroke prior to the guide carriage being generally at the end of each stroke, and wherein the guide assembly includes a guide support supporting the guide rail, and wherein the indexer includes a first engagement surface and a second engagement surface, the first engagement surface arranged to engage the guide support to actuate the indexer to permit the movement of the drill bit support relative to the guide carriage when the guide carriage is generally at the end of each stroke in a first direction of the alternating directions, and the second engagement surface arranged to engage the guide support to actuate the indexer to permit the movement of the drill bit support relative to the guide carriage when the guide carriage is generally at the end of each stroke in a second direction of the alternating directions.

5. A jig for cutting a mortise in a workpiece using a drilling tool having a drill bit, the jig comprising:

a guide assembly configured to locate and move the drill bit of the drilling tool relative to the workpiece, the guide assembly comprising:

a guide rail; and a guide comprising:

a guide carriage movably mounted on the guide rail for movement along the guide rail;

a drill bit support arranged to be movable with the guide carriage, the drill bit support including a rest arranged to locate the drill bit of the drilling tool relative to the workpiece, the drill bit support being movable relative to the guide carriage to change a distance between the rest and the guide carriage; and an indexer arranged to control the movement of the drill bit support relative to the guide carriage, the indexer comprising a first indexing member and a second indexing member, the first and second indexing members each being moveable between a first position and a second position independent of the other indexing member, wherein the first and second indexing members are each arranged to permit the movement of the drill bit support relative to the guide carriage in the first position, wherein the first and second indexing members are each arranged to inhibit the movement of the drill bit support relative to the guide carriage in the second position.

6. The jig of claim 5, wherein the first and second indexing members are each arranged to alternate between the first and second positions.

7. The jig of claim 6, wherein the first and second indexing members are arranged to alternate, with respect to each other, between the first and second positions such that, in operation to form the mortise, the first indexing member is disposed in the first position when the second indexing member is disposed in the second position and the second indexing member is disposed in the first position when the first indexing member is disposed in the second position.

8. The jig of claim 5, wherein the first and second indexing members each include a stop, the stop of the first indexing member arranged to engage and inhibit the movement of the drill bit support relative to the guide carriage when the first indexing member is in the second position, and the stop of the second indexing member arranged to engage and inhibit the movement of the drill bit support relative to the guide carriage when the second indexing member is in the second position.

9. The jig of claim 8, wherein the drill bit support includes a first indexing guide, the stop of the first indexing member arranged to engage the first indexing guide when the first indexing member is in the second position to inhibit the movement of the drill bit support relative to the guide carriage, the stop of the first indexing member arranged to not block the first indexing guide when the first indexing member is in the first position to permit the movement of the drill bit support relative to the guide carriage.

10. The jig of claim 9, wherein the first indexing guide includes a plurality of flanges spaced apart along a longitudinal axis of the first indexing guide, the stop of the first indexing member arranged to engage a first flange of the plurality of flanges when the first indexing member is in the second position, the stop of the first indexing member arranged to not block the first flange when the first indexing member is in the first position.

11. The jig of claim 10, wherein the stop of the second indexing member is arranged to engage the first flange of the plurality of flanges when the second indexing member is in the second position to inhibit the movement of the drill bit support relative to the guide carriage, the stop of the second indexing member arranged to not block the first flange when the second indexing member is in the first position to permit the movement of the drill bit support relative to the guide carriage.

12. A jig for cutting a mortise in a workpiece using a drilling tool having a drill bit, the jig comprising:

a base defining a cutting window arranged to view the workpiece; and a guide assembly supported by the base, the guide assembly configured to locate and move the drill bit of the drilling tool relative to the workpiece, the guide assembly comprising:

a guide rail; and a guide carriage movably mounted on the guide rail for movement along the guide rail, the guide carriage having a drill bit opening sized and shaped to receive the drill bit of the drilling tool, the drill bit opening having a longitudinal axis that is coextensive with an axis of rotation about which the drill bit rotates when the drill bit is received in the drill bit opening;

wherein the guide assembly is movable relative to the base between a cutting position and a setup position, the longitudinal axis of the drill bit opening being aligned with the cutting window of the base when the guide assembly is in the cutting position, the longitudinal axis of the drill bit opening being spaced apart from the cutting window of the base when the guide assembly is in the setup position.

13. The jig of claim 12, wherein the guide assembly overlies and generally inhibits an operator from viewing the cutting window when the guide assembly is in the cutting position, and wherein the guide assembly permits the operator to view the cutting window when the guide assembly is in the setup position.

14. The jig of claim 13, wherein the base includes indicia arranged relative to the cutting window to visually indicate the general location where the mortise will be cut.

15. The jig of claim 14, wherein the indicia includes centering indicia arranged to visually indicate a center of the mortise and end indicia arranged to visually indicate first and second ends of the mortise.

16. The jig of claim 12, further comprising a retainer configured to releasably secure the guide assembly in the cutting position.

17. The jig of claim 12, further comprising a vacuum port defining an outlet, the outlet in fluid communication with the cutting window.

* * * * *